United States Patent
Ravi et al.

(10) Patent No.: US 12,406,334 B2
(45) Date of Patent: Sep. 2, 2025

(54) PRESET STYLE TRANSFER

(71) Applicant: ADOBE INC., San Jose, CA (US)

(72) Inventors: Hareesh Ravi, San Jose, CA (US); Midhun Harikumar, Sunnyvale, CA (US); Taesung Park, San Francisco, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 287 days.

(21) Appl. No.: 18/303,271

(22) Filed: Apr. 19, 2023

(65) Prior Publication Data

US 2024/0354895 A1 Oct. 24, 2024

(51) Int. Cl.
| | |
|---|---|
| *G06T 5/50* | (2006.01) |
| *G06T 5/00* | (2024.01) |
| *G06T 11/60* | (2006.01) |
| *G06V 10/764* | (2022.01) |

(52) U.S. Cl.
CPC .................. *G06T 5/50* (2013.01); *G06T 5/00* (2013.01); *G06T 11/60* (2013.01); *G06V 10/764* (2022.01); *G06T 2200/24* (2013.01); *G06T 2207/20076* (2013.01); *G06T 2207/20081* (2013.01); *G06T 2207/20084* (2013.01); *G06T 2207/20092* (2013.01); *G06T 2207/20212* (2013.01)

(58) Field of Classification Search
CPC ... G06T 5/50; G06T 5/00; G06T 11/60; G06T 2200/24; G06T 2207/20076; G06T 2207/20081; G06T 2207/20084; G06T 2207/20092; G06T 2207/20212; G06V 10/764; G06V 10/82
See application file for complete search history.

(56) References Cited

U.S. PATENT DOCUMENTS

| | | | |
|---|---|---|---|
| 10,314,477 B1 * | 6/2019 | Goodsitt | .............. H04N 1/6088 |
| 2020/0226724 A1 * | 7/2020 | Fang | .......................... G06T 5/77 |
| 2021/0390247 A1 * | 12/2021 | Goodsitt | .............. G06F 40/186 |
| 2022/0084165 A1 * | 3/2022 | Hsiao | ........................ G06T 3/40 |

OTHER PUBLICATIONS

Park, et al., "Swapping Autoencoder for Deep Image Manipulation", Advances in Neural Information Processing Systems 33 (2020): 7198-7211.
Arthur, et al., "k-means++: The Advantages of Careful Seeding", Stanford, 2006, pp. 1-11.

(Continued)

*Primary Examiner* — John B Strege
(74) *Attorney, Agent, or Firm* — F. CHAU & ASSOCIATES, LLC

(57) ABSTRACT

Systems and methods for image processing are described. Embodiments of the present disclosure include an image generation network configured to encode a plurality of abstract images using a style encoder to obtain a plurality of abstract style encodings, wherein the style encoder is trained to represent image style separately from image content. A clustering component clusters the plurality of abstract style encodings to obtain an abstract style cluster comprising a subset of the plurality of abstract style encodings. A preset component generates an abstract style transfer preset representing the abstract style cluster.

16 Claims, 18 Drawing Sheets

(56) References Cited

OTHER PUBLICATIONS

K means code, Found on the Internet. https://scikit-learn.org/stable/about.html#/citing-scikit-learn, 6 pages.
Radford, et al., "Learning Transferable Visual Models From Natural Language Supervision", In International conference on machine learning, pp. 8748-8763, PMLR, arXiv preprint: arXiv:2103.00020v1 [cs.CV] Feb. 26, 2021.
Sparck Jones, "A statistical interpretation of term specificity and its application in retrieval", Journal of documentation 28, No. 1 (1972): 11-21.
Karras, et al., "A Style-Based Generator Architecture for Generative Adversarial Networks", In Proceedings of the IEEE/CVF conference on computer vision and pattern recognition, pp. 4401-4410, 2019.
Gatys, et al., "A Neural Algorithm of Artistic Style", arXiv preprint: arXiv:1508.06576v2 [cs.CV] Sep. 2, 2015, 16 pages.
Huang, et al., "Arbitrary Style Transfer in Real-time with Adaptive Instance Normalization", In Proceedings of the IEEE international conference on computer vision, pp. 1501-1510, 2017.
Liu, et al., "AdaAttN: Revisit Attention Mechanism in Arbitrary Neural Style Transfer", In Proceedings of the IEEE/CVF international conference on computer vision, pp. 6649-6658, 2021.

* cited by examiner

PRESET STYLE TRANSFER

BACKGROUND

The following relates generally to digital image processing using machine learning. Digital image processing refers to the use of a computer to edit a digital image or synthesize an image using an algorithm or a processing network. Image generation is a subfield of image processing. A machine learning model is used to generate a composite image (i.e., hybrid image) through combining image features from different source images.

In some cases, background images are abstract and may not contain objects that can be easily identified and transferred to a source content. Additionally, conventional image generation systems fail to generate a satisfactory composite image when a source style image is an abstract background. Therefore, there is a need in the art for an improved image processing system that can efficiently and accurately perform style transfer based on source images that are abstract.

SUMMARY

The present disclosure describes systems and methods for image processing. Embodiments of the present disclosure include an image processing apparatus configured to generate an abstract style transfer preset representing an abstract style cluster. At inference, the image processing apparatus is configured to perform preset style transfer for abstract images (e.g., abstract backgrounds). The image processing apparatus generates a composite image based on the abstract style transfer preset and a content image. The composite image includes target style attributes from the abstract style transfer preset and target structure attributes from the content image.

A method, apparatus, and non-transitory computer readable medium for image processing are described. One or more embodiments of the method, apparatus, and non-transitory computer readable medium include encoding a plurality of abstract images using a style encoder to obtain a plurality of abstract style encodings, wherein the style encoder is trained to represent image style separately from image content; clustering the plurality of abstract style encodings to obtain an abstract style cluster comprising a subset of the plurality of abstract style encodings; and generating an abstract style transfer preset representing the abstract style cluster.

A method, apparatus, and non-transitory computer readable medium for image processing are described. One or more embodiments of the method, apparatus, and non-transitory computer readable medium include obtaining training data including a plurality of abstract images; initializing an image generation network including a style encoder and a content encoder; training the image generation network to generate images that include an abstract style based on an abstract style input and content based on a content input, wherein the style encoder encodes the abstract style from the abstract style input and the content encoder encodes the content from the content input; and generating an abstract style transfer preset based on abstract style encodings of the plurality of abstract images from the style encoder.

An apparatus and method for image processing are described. One or more embodiments of the apparatus and method include a processor; a memory comprising instructions executable by the processor; an image generation network including a style encoder and a content encoder configured to generate images that include an abstract style based on an abstract style input and content based on a content input, wherein the style encoder encodes the abstract style from the abstract style input and the content encoder encodes the content from the content input; a clustering component configured to cluster a plurality of abstract style encodings from the style encoder to obtain an abstract style cluster comprising a subset of the plurality of abstract style encodings; and a preset component configured to generate an abstract style transfer preset representing the abstract style cluster.

DETAILED DESCRIPTION

Figure 1:
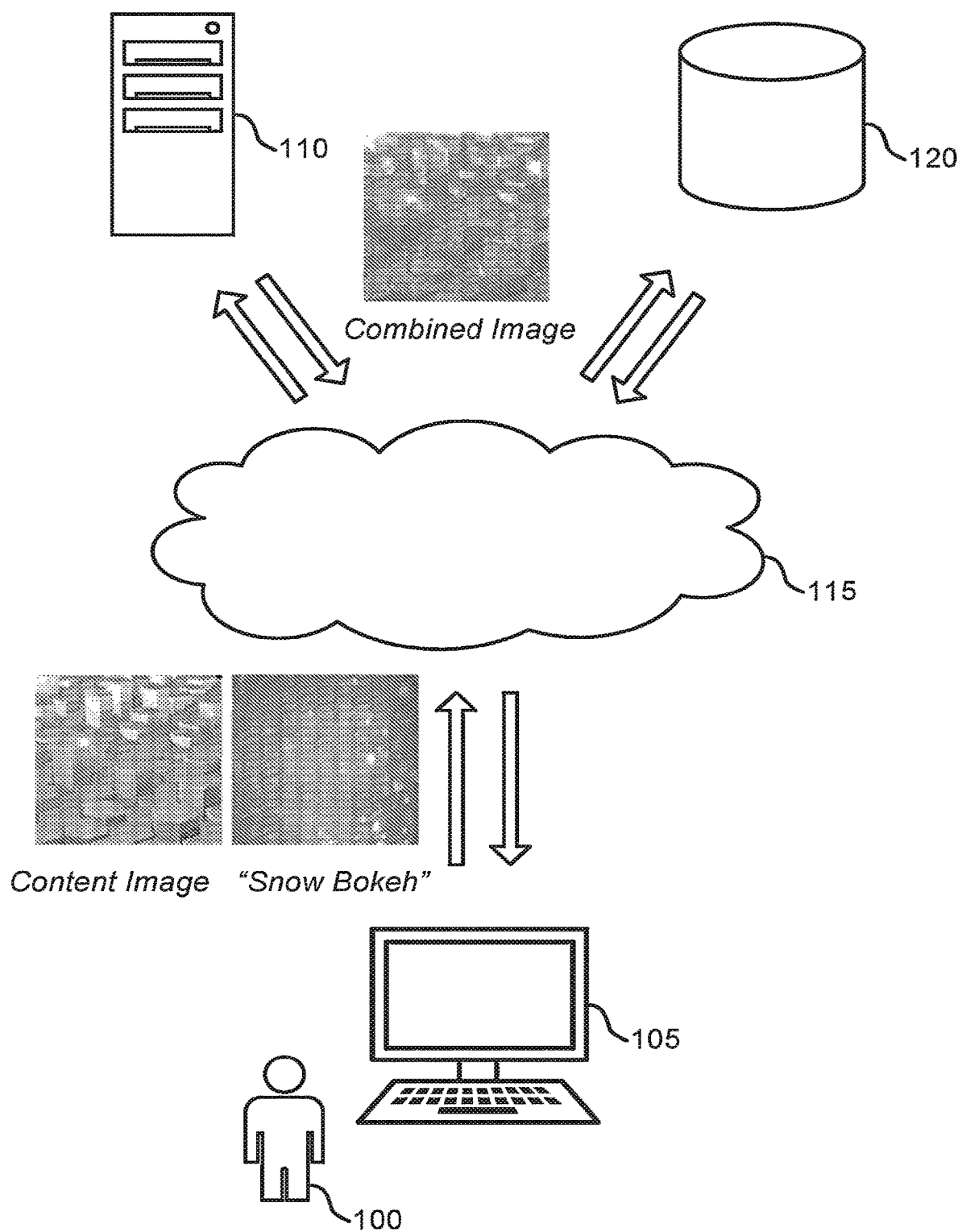
FIG. 1 shows an example of an image processing system according to aspects of the present disclosure.

The present disclosure describes systems and methods for image processing. Embodiments of the present disclosure include an image processing apparatus configured to generate an abstract style transfer preset representing an abstract style cluster. At inference, the image processing apparatus is configured to perform preset style transfer for abstract images (e.g., abstract backgrounds). The image processing apparatus generates a composite image based on the abstract style transfer preset and a content image. The composite image includes target style attributes from the abstract style transfer preset and target structure attributes from the content image.

In some examples, a style encoder (a swapping autoencoder or SAE) is first trained to learn style latent space of abstract backgrounds. Training images are clustered based on learned style space to obtain abstract style clusters. A multi-modal encoder (e.g., CLIP model) is then used to tag images in each cluster from a set of style tags. A name is selected for each abstract style cluster by combining tags of images within a cluster, forming style transfer presets. Accordingly, embodiments of the present disclosure enable controllable preset style transfer by formulating one or more identified and named style clusters.

Users often search for background images as basis for creating work product. Background images can be used in presentation slides, marketing documents, personalized photo albums, etc. In some cases, users spend hours sifting through a large amount of assets to locate an appropriate background image and transfer the style from the background image (e.g., a style image) to a source content (e.g., a content image). Additionally, background images are abstract images and hence users have a hard time describing them in their search queries. Accordingly, certain common attributes in background images (such as style, color) cannot be effectively identified or applied for subsequent style transfer.

Conventional systems are trained on training images that have objects such as human faces, buildings, or animals. These systems are not designed to process abstract backgrounds for style transfer applications. In some examples, titles or tags stored in image retrieval systems include generic background shapes that are not descriptive of various facets, color palettes, and styles associated with the images. Image editing tools such as Photoshop® may be used to modify the style of an image, but such tools are difficult for average users when more complex layered background patterns are involved. As a result, users have a hard time transferring style from an abstract background image and user satisfaction is decreased.

Embodiments of the present disclosure include an image processing apparatus configured to generate an abstract style transfer preset representing an abstract style cluster. At inference time, the image processing apparatus generates, via an image generation network, a composite image based on a content image and an abstract style transfer preset. In some examples, the abstract style transfer preset is selected from a set of abstract style transfer presets that are pre-generated. The set of abstract style transfer presets are generated using machine learning and clustering methods. The combined image includes structural content from the content image and a style from the abstract style transfer preset. The composite image captures target style attributes from the abstract style transfer preset and target structure attributes from the content image.

In some embodiments, a style encoder is configured to encode a set of abstract images to obtain a set of abstract style encodings. The style encoder is trained to represent image style separately from image content. For example, a swapping autoencoder model disentangles the target style features and structure features, where the target style features are used in subsequent steps. A clustering component of the image processing apparatus is configured to cluster the set of abstract style encodings to obtain an abstract style cluster including a subset of the set of abstract style encodings.

In some embodiments, a swapping autoencoder model learns style representation using self-supervised method. The swapping autoencoder model is trained on abstract background dataset. The clustering component is configured to generate a set of clusters (e.g., using k means clustering) based on the style representation of the training images. In some examples, 100 clusters are generated. A multi-modal encoder (e.g., CLIP model) generates an image embedding for each of the training images. CLIP (Contrastive Language-Image Pre-Training) model is a neural network trained on a variety of (image, text) pairs. In some examples, top 10 tags associated with each cluster is identified based on comparing the image embeddings of the training images and style tag embeddings. Given the images and the style tags associated with each of the images, a scoring component computes a relevance score and a tag frequency score. The image processing apparatus combines the tags of images within each cluster to name the style of each cluster using a style tag based on the relevance score and the tag frequency score. In some cases, the relevance score calculates the relevance of each tag to a specific cluster, the tag frequency score calculates how specific each tag is to a specific cluster relative to other clusters. An overall score is the product of the relevance score and the tag frequency score.

Accordingly, the image processing apparatus of the present disclosure can identify a set of "style cluster" without human annotation such as class labels and manual tagging. The obtained style clusters are named to enable controlled preset style transfer for the named styles. In some examples, the abstract style transfer presets representing the abstract style clusters include "snow bokeh", "crumpled parchment", "blue swirl laser", "galaxy constellation". In some examples, color information can be exclusively transferred to a content image using pre-generated abstract style transfer presets. For example, for primarily color transfer, the abstract style transfer presets representing the abstract style clusters include "cloudy bokeh", "gold dazzling bokeh", "red particle bokeh", "purple color background", "turquoise water", etc. These abstract style transfer presets can be implemented on an image editing application (e.g., Photoshop®) for selection. Users select one or more abstract style transfer presets as conditioning and the image processing apparatus automatically generates different combined images based on the selected preset and a content image. As a result, quality and variety of composite images is increased and the image processing apparatus can output a wide variety of high-quality images for subsequent content creation.

Embodiments of the present disclosure can be used in the context of style transfer applications. For example, an image processing network based on the present disclosure takes a content image and an abstract style transfer preset as input and efficiently generates a combined image that includes the style from the abstract style transfer preset and structural content of the content image. Example application or use cases, according to some embodiments, are provided with reference to FIGS. 6-9. Details regarding the architecture of an example image processing apparatus are provided with reference to FIGS. 1-5. Example processes for image generation are provided with reference to FIGS. 10-15. Example training processes are described with reference to FIGS. 16-17.

Image Processing Network

In FIGS. 1-5, an apparatus and method for image processing is described. One or more aspects of the apparatus include a processor; a memory comprising instructions executable by the processor; an image generation network including a style encoder and a content encoder configured to generate images that include an abstract style based on an abstract style input and content based on a content input, wherein the style encoder encodes the abstract style from the abstract style input and the content encoder encodes the content from the content input; a clustering component configured to cluster a plurality of abstract style encodings from the style encoder to obtain an abstract style cluster comprising a subset of the plurality of abstract style encodings; and a preset component configured to generate an abstract style transfer preset representing the abstract style cluster.

In some embodiments, the preset component is configured to identify a plurality of style tags associated with images in the abstract style cluster and to select one or more style tags for the abstract style cluster from the plurality of style tags, wherein the abstract style transfer preset includes the one or more style tags.

Some examples of the apparatus and method further include a multi-modal encoder configured to generate image embeddings for a plurality of abstract images and to generate text embeddings for a plurality of style tags.

Some examples of the apparatus and method further include a training component configured to train the image generation network using unsupervised learning based on a plurality of abstract images.

Some examples of the apparatus and method further include an image editing interface configured to receive a user input identifying the abstract style transfer preset from a plurality of abstract style transfer presets, wherein a combined image is generated based on the user input.

FIG. 1 shows an example of an image processing system according to embodiments of the present disclosure. The example shown includes user 100, user device 105, image processing apparatus 110, cloud 115, and database 120. Image processing apparatus 110 is an example of, or includes aspects of, the corresponding element described with reference to FIG. 2.

As an example shown in FIG. 1, user 100 provides a content image and selects an abstract style transfer preset from abstract style transfer presets. The content image and the selected abstract style transfer preset are transmitted to image processing apparatus 110, e.g., via a user interface implemented on user device 105 and cloud 115. For example, the selected abstract style transfer preset is "snow bokeh" that represents an abstract style cluster. For example, the content image in FIG. 1 shows hexagonal blocks that are of different heights and are arranged in multiple rows. In some cases, the abstract style transfer preset refers to a group of images that belong to a same abstract style cluster and these images from the style cluster share similar abstract background features (e.g., similar style, attribute, texture, design).

Image processing apparatus 110 learns a style space using a swapping autoencoder model based on an abstract image dataset. Image processing apparatus 110, via a clustering component and a preset component, generates the abstract style transfer preset by identifying a set of style clusters and naming a style for each of the style clusters. This naming process is completed automatically without human in the loop. The abstract style transfer preset represents an abstract style cluster that includes images of a similar style that are clustered together. For example, the abstract style transfer preset is named as "snow bokeh". In this example, the image shown is a representative image from the abstract style cluster named "snow bokeh".

Image processing apparatus 110, via an image generation network, generates a combined image based on the content image and the selected abstract style transfer preset. The combined image includes the structural content from the content image and a style from the abstract style transfer preset. The style-related attributes of the abstract style transfer preset are transferred or applied to the content image. The combined image is displayed to user 100 for subsequent editing via cloud 115 and user device 105.

Image processing apparatus 110 accurately captures the style in the abstract style transfer preset to generate the combined image. Further, the combined image is consistent in texture and structure with the content image. Referring to FIG. 1, the combined image includes the hexagonal blocks of the content image in a "snow bokeh" style. Image processing apparatus 110 returns the combined image to user 100 via cloud 115 and user device 105. The process of using image processing apparatus 110 is further described with reference to FIG. 5.

User device 105 may be a personal computer, laptop computer, mainframe computer, palmtop computer, personal assistant, mobile device, or any other suitable processing apparatus. In some examples, user device 105 includes software that incorporates an image processing application (e.g., an image editing application). The image editing application may either include or communicate with image processing apparatus 110. In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote-control device interfaced with the user interface directly or through an I/O controller module). In some cases, a user interface may be a graphical user interface (GUI). In some examples, a user interface may be represented in code which is sent to the user device and rendered locally by a browser.

Image processing apparatus 110 includes a computer implemented network. Image processing apparatus 110 may also include a processor unit, a memory unit, an I/O module, and a training component. The training component is used to train a machine learning model (e.g., an image generation network). Additionally, image processing apparatus 110 can communicate with database 120 via cloud 115. In some cases, the architecture of the image processing network is also referred to as a network or a network model. Further detail regarding the architecture of image processing apparatus 110 is provided with reference to FIG. 2-4. Further detail regarding the operation of image processing apparatus 110 is provided with reference to FIGS. 10-14.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
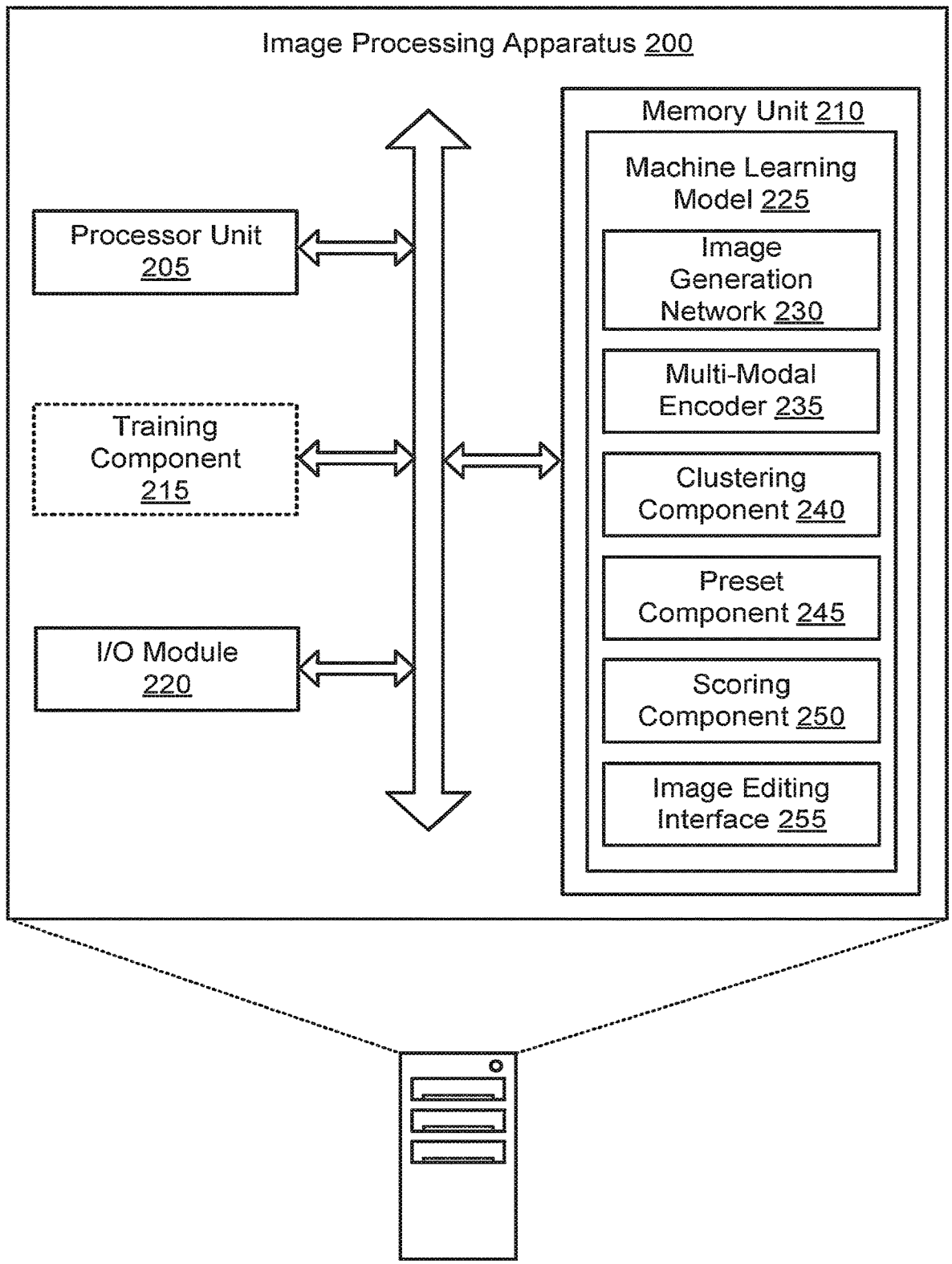
FIG. 2 shows an example of an image processing apparatus according to aspects of the present disclosure.

FIG. 2 shows an example of an image processing apparatus 200 according to embodiments of the present disclosure. The example shown includes image processing apparatus 200 comprising processor unit 205, memory unit 210, training component 215, and I/O module 220. In some cases, memory unit 210 stores initial parameters and trained parameters of machine learning model 225. Image processing apparatus 200 is an example of, or includes aspects of, the corresponding element described with reference to FIG. 1.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into processor unit 205. In some cases, processor unit 205 is configured to execute computer-readable instructions stored in a memory to perform various functions. In some embodiments, processor unit 205 includes special purpose components for modem processing, baseband processing, digital signal processing, or transmission processing. Processor unit 205 is configured to execute instructions stored in memory unit 210.

Memory unit 210 includes instructions executable by processor unit 205. Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state. Memory unit 210 includes machine learning model 225 and stores parameters of machine learning model 225.

According to some embodiments of the present disclosure, image processing apparatus 200 includes a computer implemented artificial neural network (ANN) for image generation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, image processing apparatus 200 includes a convolutional neural network (CNN) for image generation. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 215 obtains training data including a set of abstract images.

Training component 215 initializes an image generation network 230 including a style encoder and a content encoder. Training component 215 trains image generation network 230 to generate images that include an abstract style based on an abstract style input and content based on a content input, where the style encoder encodes the abstract style from the abstract style input and the content encoder encodes the content from the content input. In some examples, training component 215 computes a reconstruction loss based on the reconstructed image, where image generation network 230 is trained based on the reconstruction loss. In some examples, training component 215 computes a style loss based on the style transfer image, where image generation network 230 is trained based on the style loss.

According to some embodiments, training component 215 is configured to train image generation network 230 using unsupervised learning based on a set of abstract images. Training component 215 is an example of, or includes aspects of, the corresponding element described with reference to FIGS. 16-17. In some cases, training component 215 is implemented on a separate apparatus other than image processing apparatus 200 to perform the functions described herein. Image processing apparatus 200 communicates with the separate apparatus to perform the training processes described herein.

I/O module 220 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 220 includes a user interface. A user interface may enable a user to interact with a device. In some embodiments, the user interface may include an audio device, such as an external speaker system, an external display device such as a display screen, or an input device (e.g., a remote-control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to an embodiment, machine learning model 225 includes image generation network 230, multi-modal encoder 235, clustering component 240, preset component 245, scoring component 250, and image editing interface 255. Machine learning model 225 is an example of, or includes aspects of, the corresponding element described with reference to FIG. 5.

Machine learning model 225 makes predictions based on input data in an image generation application. Developing a machine learning model is an iterative process of writing, editing, re-writing, and testing configurations, algorithms, and model parameters. The process includes the stages of acquiring and exploring data, identifying features of the data, creating a model, evaluating the model, making predictions, and developing insights based on the model. The model can then be implemented on a large-scale platform enabling other users to deploy functionalities and capabilities from large datasets across different use cases.

According to some embodiments, image generation network 230 encodes a set of abstract images using a style encoder to obtain a set of abstract style encodings, where the style encoder is trained to represent image style separately from image content. In some embodiments, the style encoder is trained using unsupervised learning based on the set of abstract images. In some examples, image generation network 230 generates a combined image based on the content image and the abstract style transfer preset, where the combined image includes the structural content from the content image and a style from the abstract style transfer preset. In some examples, image generation network 230 encodes the content image to obtain a content encoding representing the structural content. Image generation network 230 identifies an abstract style encoding of the abstract style transfer preset, where the combined image is generated based on the content encoding and the abstract style encoding.

According to some embodiments, image generation network 230 generates a reconstructed image based on a style encoding and a content encoding of an input image. In some examples, image generation network 230 generates a style transfer image based on a style encoding of a style image and a content encoding of a content image.

According to some embodiments, image generation network 230 includes a style encoder and a content encoder configured to generate images that include an abstract style based on an abstract style input and content based on a content input, where the style encoder encodes the abstract style from the abstract style input and the content encoder encodes the content from the content input. Image generation network 230 is an example of, or includes aspects of, the corresponding element described with reference to FIG. 5.

According to some embodiments, clustering component 240 is configured to cluster a set of abstract style encodings from the style encoder to obtain an abstract style cluster comprising a subset of the set of abstract style encodings. Clustering component 240 is an example of, or includes aspects of, the corresponding element described with reference to FIG. 5.

According to some embodiments, preset component 245 generates an abstract style transfer preset representing the abstract style cluster. In some examples, preset component 245 identifies a set of style tags associated with images in the abstract style cluster. Preset component 245 selects one or more style tags for the abstract style cluster from a set of style tags, where the abstract style transfer preset includes the one or more style tags. In some examples, preset component 245 performs zero-shot classification on the set of abstract images to obtain probability values corresponding to the set of style tags for each of the abstract images.

According to some embodiments, preset component 245 generates an abstract style transfer preset based on abstract style encodings of the set of abstract images from the style encoder. According to some embodiments, preset component 245 is configured to generate an abstract style transfer preset representing the abstract style cluster. In some embodiments, preset component 245 is configured to identify a set of style tags associated with images in the abstract style cluster and to select one or more style tags for the abstract style cluster from the set of style tags, where the abstract style transfer preset includes the one or more style tags. Preset component 245 is an example of, or includes aspects of, the corresponding element described with reference to FIG. 5.

According to some embodiments, scoring component 250 ranks the set of style tags based on the probability values, where the one or more style tags are selected based on the ranking. In some examples, scoring component 250 computes a relevance score based on a distance between the images and a center of the abstract style cluster, where the one or more style tags are selected based on the relevance score. In some examples, scoring component 250 computes a tag frequency score based on a cluster tag frequency for the abstract style cluster and an overall tag frequency for the set of abstract images, where the one or more style tags are selected based on the tag frequency score. Scoring component 250 is an example of, or includes aspects of, the corresponding element described with reference to FIG. 5.

According to some embodiments, image editing interface 255 obtains a content image including structural content. In some examples, image editing interface 255 receives a user input identifying the abstract style transfer preset from a set of abstract style transfer presets, where the combined image is generated based on the user input. In some examples, image editing interface 255 receives a user input indicating a style transfer weight corresponding to the abstract style transfer preset, where the combined image is generated based on the style transfer weight. Image editing interface 255 is an example of, or includes aspects of, the corresponding element described with reference to FIG. 5.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 3:
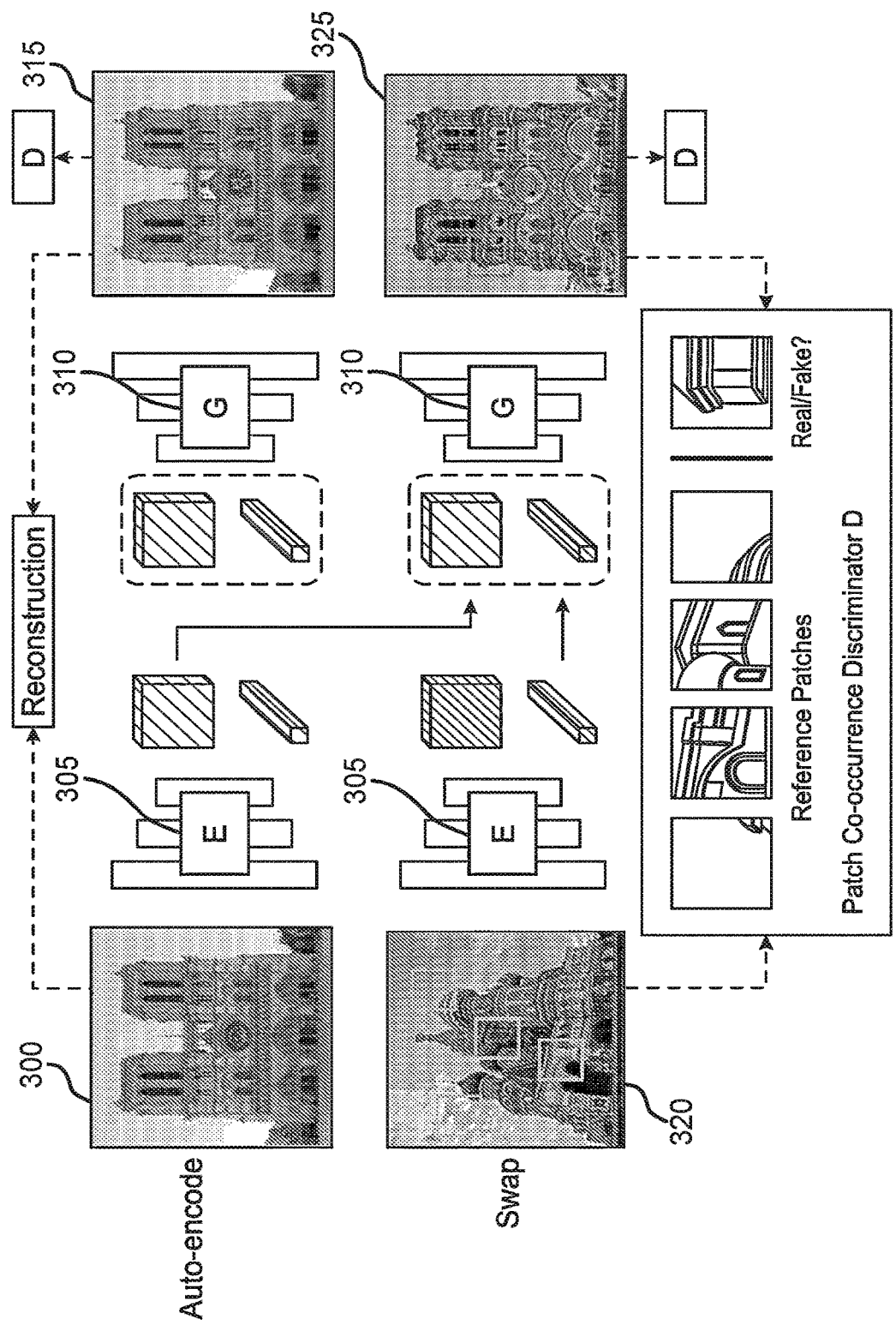
FIG. 3 shows an example of a swapping autoencoder (SAE) network according to aspects of the present disclosure.

FIG. 3 shows an example of a swapping autoencoder network according to embodiments of the present disclosure. The example shown includes first image 300, image encoder 305, image generator 310, first reconstructed image 315, second image 320, and second reconstructed image 325. Image encoder 305 is an example of, or includes aspects of, the corresponding element described with reference to FIG. 4. Image generator 310 is an example of, or includes aspects of, the corresponding element described with reference to FIG. 4.

In some cases, a swapping autoencoder (SAE) model facilitates disentangling of style embeddings and structure embeddings extracted from images. The SAE model is trained in an unsupervised manner and hence is not dependent on annotated data. The SAE model includes an image encoder 305 (denoted as E) which embeds the input into two codes, i.e., style embedding and structure embedding. The style embedding is used in the subsequent steps of training. A patch co-occurrence discriminator $D_{patch}$ ensures that the generated image looks real and matches the texture of the first input image.

In some cases, the swapping autoencoder model includes autoencoding and swapping operations. Image encoder 305 (also denoted as E) is configured to convert an input image into two codes, i.e., structure code and texture code. Image generator 310 (also referred to as decoder G) and a discriminator D ensure the generation of a realistic image. In some examples, a reconstruction loss is used to ensure first reconstructed image 315 resembles first image 300. Similarly, the texture code is used for decoding from a second image. A patch co-occurrence discriminator $D_{patch}$ ensures that second reconstructed image 325 looks real and matches the texture of first image 300.

As shown in FIG. 3, image encoder 305 extracts style embedding from second image 320. The extracted style embedding is used in subsequent training steps. Image encoder 305 is an example of, or includes aspects of, the corresponding element described with reference to FIG. 4. Image generator 310 is an example of, or includes aspects of, the corresponding element described with reference to FIG. 4.

Figure 4:
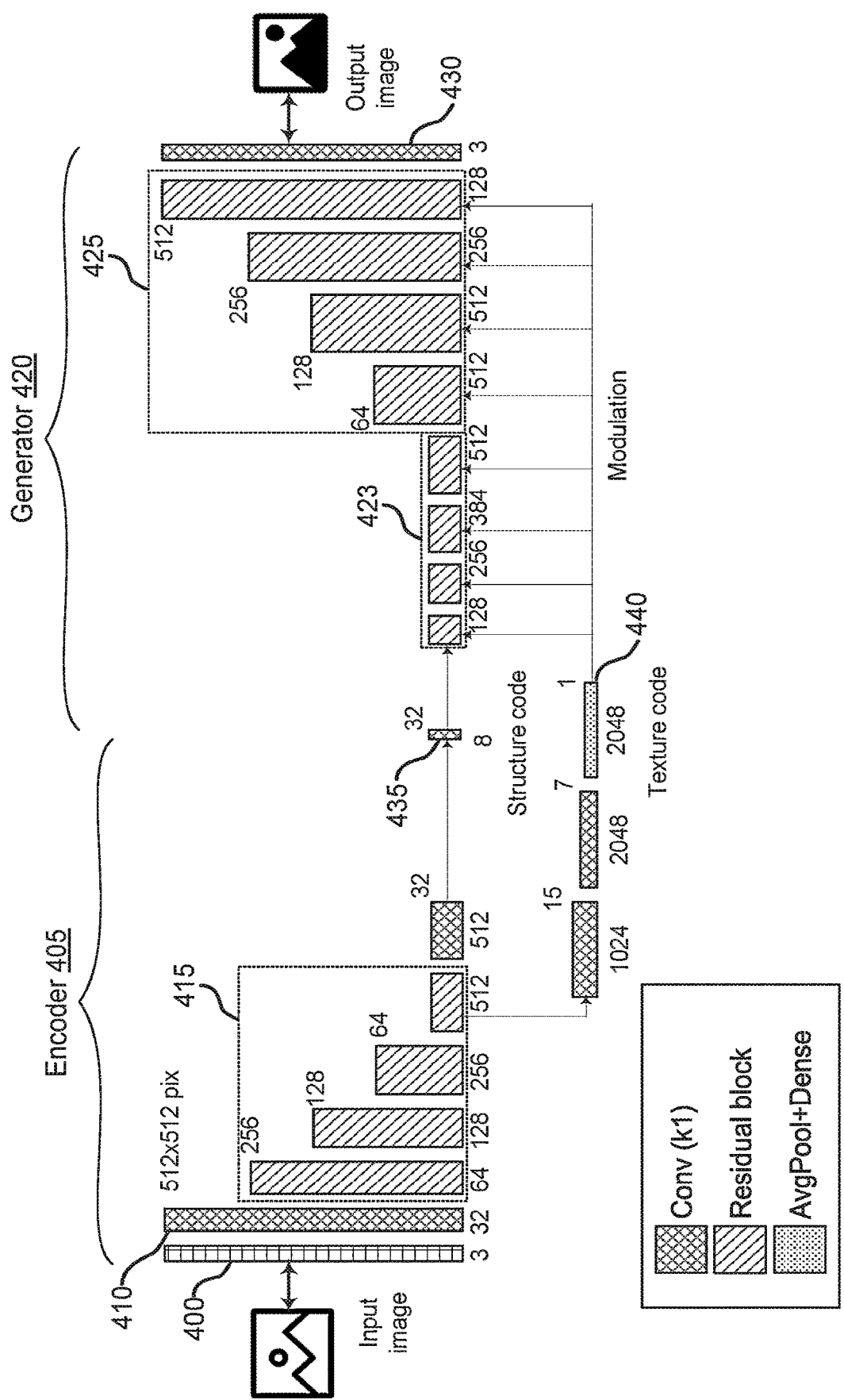
FIG. 4 shows an example of an encoder network and a generator network according to aspects of the present disclosure.

FIG. 4 shows an example of an encoder network and a generator network according to embodiments of the present disclosure. The example shown includes input image 400, image encoder 405, image generator 420, structure code 435, texture code 440, and output image 430. In one embodiment, image encoder 405 includes convolution layer 410 and downsampling residual blocks 415. Image generator 420 includes residual blocks 423 and upsampling residual blocks 425. Image generator 420 is an example of, or includes aspects of, the corresponding element described with reference to FIG. 3. Image encoder 405 is an example of, or includes aspects of, the corresponding element described with reference to FIG. 3.

Image encoder 405 is an example of, or includes aspects of, the corresponding element described with reference to FIG. 3. Image generator 420 is an example of, or includes aspects of, the corresponding element described with reference to FIG. 3.

Image encoder 405 maps the input image 400 to structure code 435 and texture code 440, as shown in FIG. 4 (left). To obtain structure code 435, the network includes 4 downsampling residual blocks 415, followed by two convolution layers. To obtain texture code 440, the network branches off and adds 2 convolutional layers, followed by an average pooling (to completely remove spatial dimensions) and a dense layer. The asymmetry of the code shapes is designed to impose an inductive bias and encourage decomposition into orthogonal tensor dimensions. Given an 256×256 image, structure code 435 is of dimension 16×16×8 (large spatial dimension), and texture code 440 is of dimension 1×1×2048 (large channel dimension).

The texture code 440 is designed to be agnostic to positional information by using reflection padding or no padding ("valid") in the convolutional layers (rather than zero padding) followed by average pooling. On the other hand, each location of the structure code 435 has a strong inductive bias to encode information in its neighborhood, due to its fully convolutional architecture and limited receptive field.

Image generator 420 maps the codes back to an image, as shown in FIG. 4 (right). The network uses structure code 435 in the main branch, that includes four residual blocks 423 and four upsampling residual blocks 425. The texture code 440 is injected using the weight modulation/demodulation layer from StyleGAN2. Image generator 420 generates output image 430 by applying a convolutional layer at the end of the residual blocks.

Figure 5:
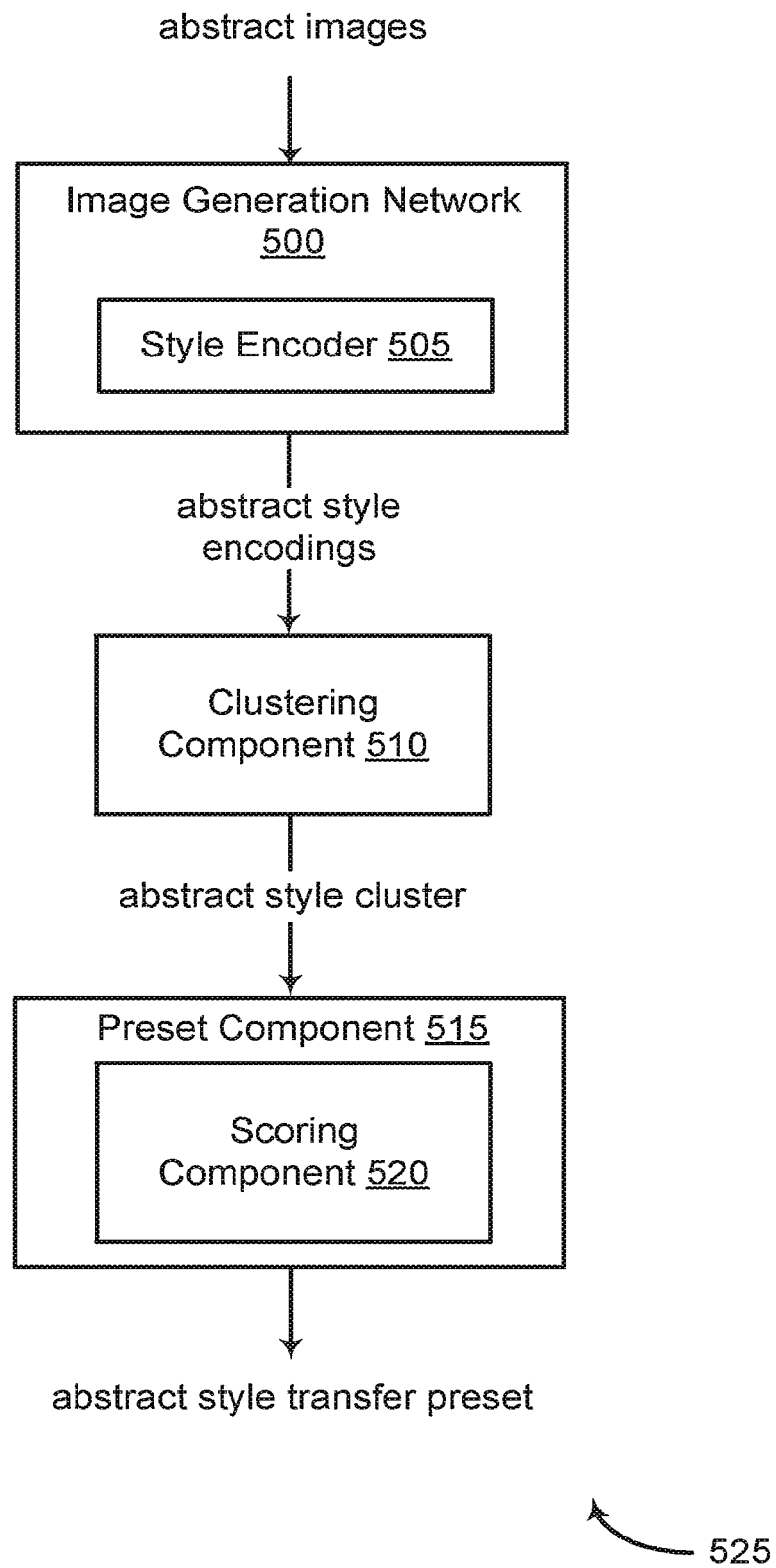
FIG. 5 shows an example of a machine learning model according to aspects of the present disclosure.

FIG. 5 shows an example of a machine learning model 525 according to embodiments of the present disclosure. The example shown includes machine learning model 525 that further comprises image generation network 500, clustering component 510, and preset component 515. Machine learning model 525 is trained to generate an abstract style transfer preset based on abstract images. Machine learning model 525 is an example of, or includes aspects of, the corresponding element described with reference to FIG. 2. Machine learning model 525 generates an abstract style transfer preset representing an abstract style cluster through clustering, identifying, and naming styles based on a set of abstract images.

According to some embodiments of the present disclosure, image generation network 500 learns style space based on a set of abstract images (e.g., abstract image dataset). The abstract images are used to train image generation network 500, for example a swapping autoencoder model, to identify style representations of the abstract images.

In an embodiment, the abstract images are input to image generation network 500. Image generation network 500 is an example of, or includes aspects of, the corresponding element described with reference to FIG. 2. In one embodiment, image generation network 500 includes style encoder 505. Style encoder 505 encodes the abstract images to generate a set of abstract style encodings. In some cases, style encoder 505 is trained to represent image style and image content separately. In some examples, the abstract image dataset includes 1 million abstract background images. Further details regarding the training image generation network 500 are described with reference to FIGS. 15-16.

The abstract style encodings are input to clustering component 510. In an embodiment, clustering component 510 is configured to perform k-means clustering using the abstract style encodings to identify one or more abstract style clusters. An abstract style cluster includes a subset of the set of abstract style encodings. Clustering component 510 is an example of, or includes aspects of, the corresponding element described with reference to FIG. 2.

The abstract style cluster is input to preset component 515. In an embodiment, preset component 515 combines tags of the images in the abstract style cluster to obtain a style name for the abstract style cluster. A pretrained CLIP model generates image embeddings corresponding to the abstract images. Preset component 515 performs zero-shot classification over a vocabulary of approximately 3000 style tags for the images based on the image embedding (e.g., CLIP embeddings). Preset component 515 is an example of, or includes aspects of, the corresponding element described with reference to FIG. 2.

Contrastive Language-Image Pre-training (CLIP) model is a neural network that is trained to efficiently learn visual concepts from natural language supervision. CLIP can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets. The CLIP model can be used for a wide range of visual classification tasks, enabling the prediction of the likelihood of a text description being associated with a specific image. For example, when applied to nearly arbitrary visual classification tasks, a CLIP model may predict the likelihood of a text description being paired with a particular image, without the need for users to design classifiers and the need for task-specific training data. For example, a CLIP model can be applied to a new task by providing names of the task's visual concepts as input to the model's text encoder. The model can then output a linear classifier of CLIP's visual representations.

Zero-shot learning is a variation of few-shot learning. Zero-shot learning aims to classify an unseen class without exposure to any instances belonging to that class in the training dataset. For example, a model may consider general traits of an object such as appearance, properties, and functionalities to classify the object without depending on any training data.

Few-shot learning is a type of machine learning method where the training dataset contains limited information. Few-shot learning is characterized as meta-learning task, where the model is understood as "learning to learn." Unlike traditional machine learning, few-shot learning classifies new data with small training data (between zero and five examples). Applications of few-shot learning involve computer vision, natural language processing (NLP), audio processing, robotics, healthcare, and mathematical applications. K-shot learning, a variation of few-shot learning, uses K number of examples as training dataset to classify an object in an image. In a N-way K-shot learning, another variation of few-shot learning, there is a training set (i.e., support set) consisting of N class labels and K labeled images for each class (i.e., K examples) and a query set consisting of query images. Unlike supervised learning, in which the data is split into training, validation, and test sets, few-shot learning splits the dataset into training sets and test sets.

According to an embodiment, preset component 515 includes scoring component 520. Scoring component 520 computes one or more scores, rank the tags found based on the one or more scores, and combine the tags for a cluster to obtain a named style. Scoring component 520 is an example of, or includes aspects of, the corresponding element described with reference to FIG. 2. Machine learning model 525 obtains top 10 style tags associated with each image and the probabilities of the tags. Preset component 515 combines the style tags of images within an abstract style cluster to obtain a named style for the abstract style cluster (e.g., a relevant style tag is selected to represent the abstract style cluster). Preset component 515 generates an abstract style transfer preset that represents an abstract style cluster. Further details regarding naming a style for an abstract style cluster are described with reference to FIGS. 12-14.

Generating Abstract Style Transfer Preset

In FIGS. 6-15, a method, apparatus, and non-transitory computer readable medium for image processing is described. One or more embodiments of the method, apparatus, and non-transitory computer readable medium include encoding a plurality of abstract images using a style encoder to obtain a plurality of abstract style encodings, wherein the style encoder is trained to represent image style separately from image content; clustering the plurality of abstract style encodings to obtain an abstract style cluster comprising a subset of the plurality of abstract style encodings; and generating an abstract style transfer preset representing the abstract style cluster.

Some examples of the method, apparatus, and non-transitory computer readable medium further include obtaining a content image including structural content. Some examples further include generating a combined image based on the content image and the abstract style transfer preset, wherein the combined image includes the structural content from the content image and a style from the abstract style transfer preset.

Some examples of the method, apparatus, and non-transitory computer readable medium further include encoding the content image to obtain a content encoding representing the structural content. Some examples further include identifying an abstract style encoding of the abstract style transfer preset, wherein the combined image is generated based on the content encoding and the abstract style encoding.

Some examples of the method, apparatus, and non-transitory computer readable medium further include receiving a user input identifying the abstract style transfer preset from a plurality of abstract style transfer presets, wherein the combined image is generated based on the user input.

Some examples of the method, apparatus, and non-transitory computer readable medium further include receiving a user input indicating a style transfer weight corresponding to the abstract style transfer preset, wherein the combined image is generated based on the style transfer weight. In some embodiments, the style encoder is trained using unsupervised learning based on the plurality of abstract images.

Some examples of the method, apparatus, and non-transitory computer readable medium further include identifying a plurality of style tags associated with images in the abstract style cluster. Some examples further include selecting one or more style tags for the abstract style cluster from a plurality of style tags, wherein the abstract style transfer preset includes the one or more style tags.

Some examples of the method, apparatus, and non-transitory computer readable medium further include generating image embeddings corresponding to the plurality of abstract images. Some examples further include performing zero-shot classification on the plurality of abstract images to obtain probability values corresponding to the plurality of style tags for each of the abstract images. Some examples further include ranking the plurality of style tags based on the probability values, wherein the one or more style tags are selected based on the ranking.

Some examples of the method, apparatus, and non-transitory computer readable medium further include computing a relevance score based on a distance between the images and a center of the abstract style cluster, wherein the one or more style tags are selected based on the relevance score.

Some examples of the method, apparatus, and non-transitory computer readable medium further include computing a tag frequency score based on a cluster tag frequency for the abstract style cluster and an overall tag frequency for the plurality of abstract images, wherein the one or more style tags are selected based on the tag frequency score.

Figure 6:
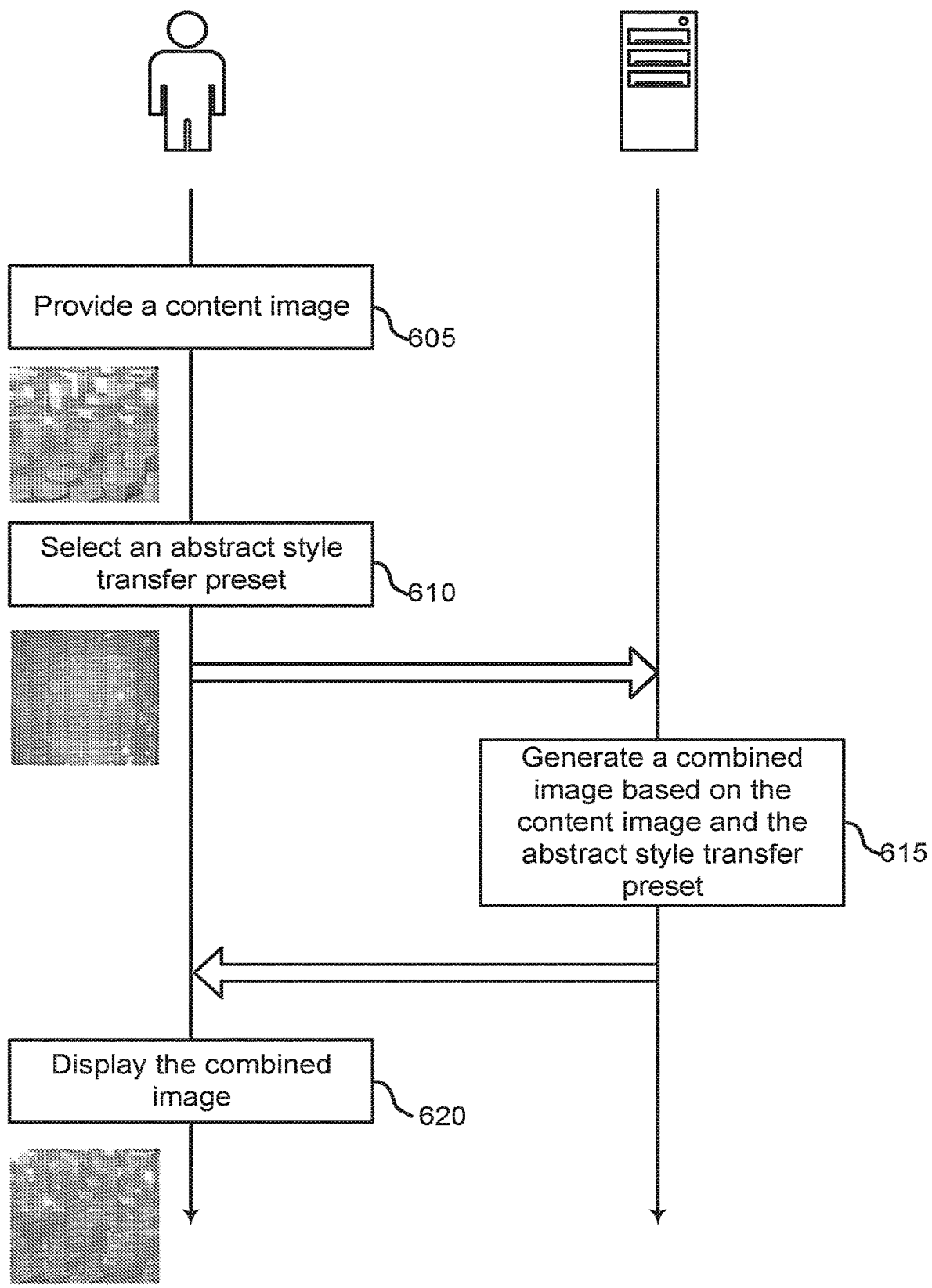
FIG. 6 shows an example of a style transfer process according to aspects of the present disclosure.

FIG. 6 shows an example of a style transfer process according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the user provides a content image. In some cases, the operations of this step refer to, or may be performed by, a user as described with reference to FIG. 1. In some cases, the content image is an abstract image that includes a structure and texture information for generating the combined image. As an example shown in FIG. 6, the content image includes hexagon shaped blocks. The hexagon shaped blocks are arranged in rows and the blocks are of different heights. The content image is selected and uploaded to the image processing apparatus e.g., via a user interface.

At operation 610, the user selects an abstract style transfer preset. In some cases, the operations of this step refer to, or may be performed by, a user as described with reference to FIGS. 1 and 5. In some cases, the abstract style transfer preset refers to a predetermined abstract style to be applied to a content image. Each abstract style transfer preset has unique style-related attributes, composition, pattern, etc. The abstract style transfer preset is selected by the user from a set of abstract style transfer presets. For example, the abstract style transfer preset, as shown in FIG. 6, is "snow bokeh". Further details regarding operations of generating an abstract style transfer preset are provided with reference to FIGS. 5, 10, and 12-14.

At operation 615, the system generates a combined image based on the content image and the abstract style transfer preset. In some cases, the operations of this step refer to, or may be performed by, an image processing apparatus as described with reference to FIGS. 1 and 2. The image processing apparatus takes the content image and the selected abstract style transfer preset as input and generates a combined image. The combined image includes the structural content from the content image and a style from the abstract style transfer preset.

At operation 620, the system displays the combined image to the user. In some cases, the operations of this step refer to, or may be performed by, an image processing apparatus as described with reference to FIGS. 1 and 2. In some cases, the combined image is presented to the user, e.g., via the user interface. The combined image depicts the style from the abstract style transfer preset and captures the structure and texture information of the content image. In the above example, the combined image maintains the structure of the content image (i.e., hexagon shaped blocks arranged in rows and the blocks are of different heights) in a "snow bokeh" style. The combined image looks stylish and eye-catching compared to the content image (i.e., the original input).

Figure 7:
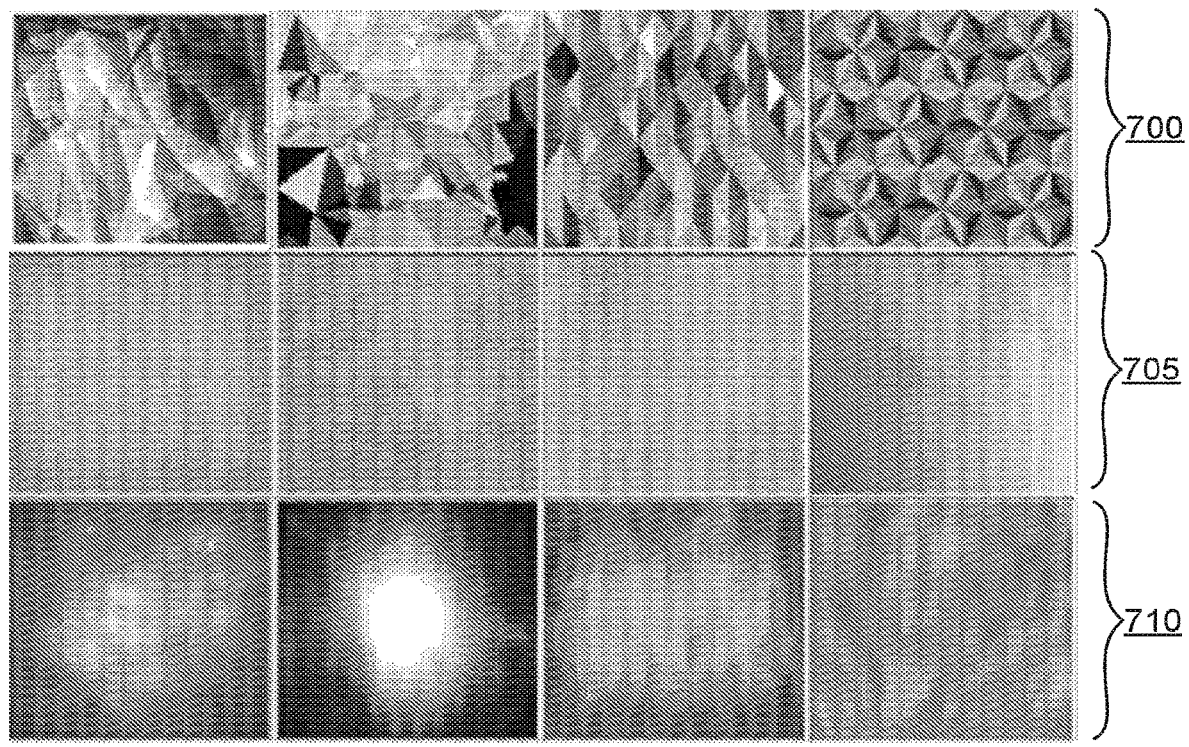
FIG. 7 shows an example of a cluster of images according to aspects of the present disclosure.

FIG. 7 shows an example of a cluster of images according to embodiments of the present disclosure. The example shown includes first cluster 700, second cluster 705, and third cluster 710.

As an example shown in FIG. 7, first cluster 700, second cluster 705, and third cluster 710 refer to separate clusters of images. For example, first cluster 700 is obtained by clustering a style space of a swapping autoencoder model that is trained on abstract background images. In some cases, a style space includes abstract style encodings of abstract images. According to an embodiment, image processing apparatus 200 as shown in FIG. 2 performs clustering using style representation corresponds each of the abstract background images. Image processing apparatus 200 generates style clusters based on qualitative and quantitative evaluation of the abstract images.

Image processing apparatus 200 tags images in each cluster and combines the tags of images within a cluster to obtain a name for each style cluster. The style cluster is also referred to as an abstract style cluster. Image processing apparatus 200 generates an abstract style transfer preset representing the abstract style cluster. At inference time, a set of abstract style transfer presets are for selection. Referring to FIG. 7, first cluster 700 includes representative images (e.g., four images) that follow a similar style. These are the images from the same cluster. Similarly, second cluster 705 and third cluster 710 include a set of images that have similar style or style-related attributes, respectively. In this example, four representative images are shown. Further details regarding operations of clustering of a style space (abstract style encodings) are provided with reference to FIGS. 5 and 10.

Figure 8:
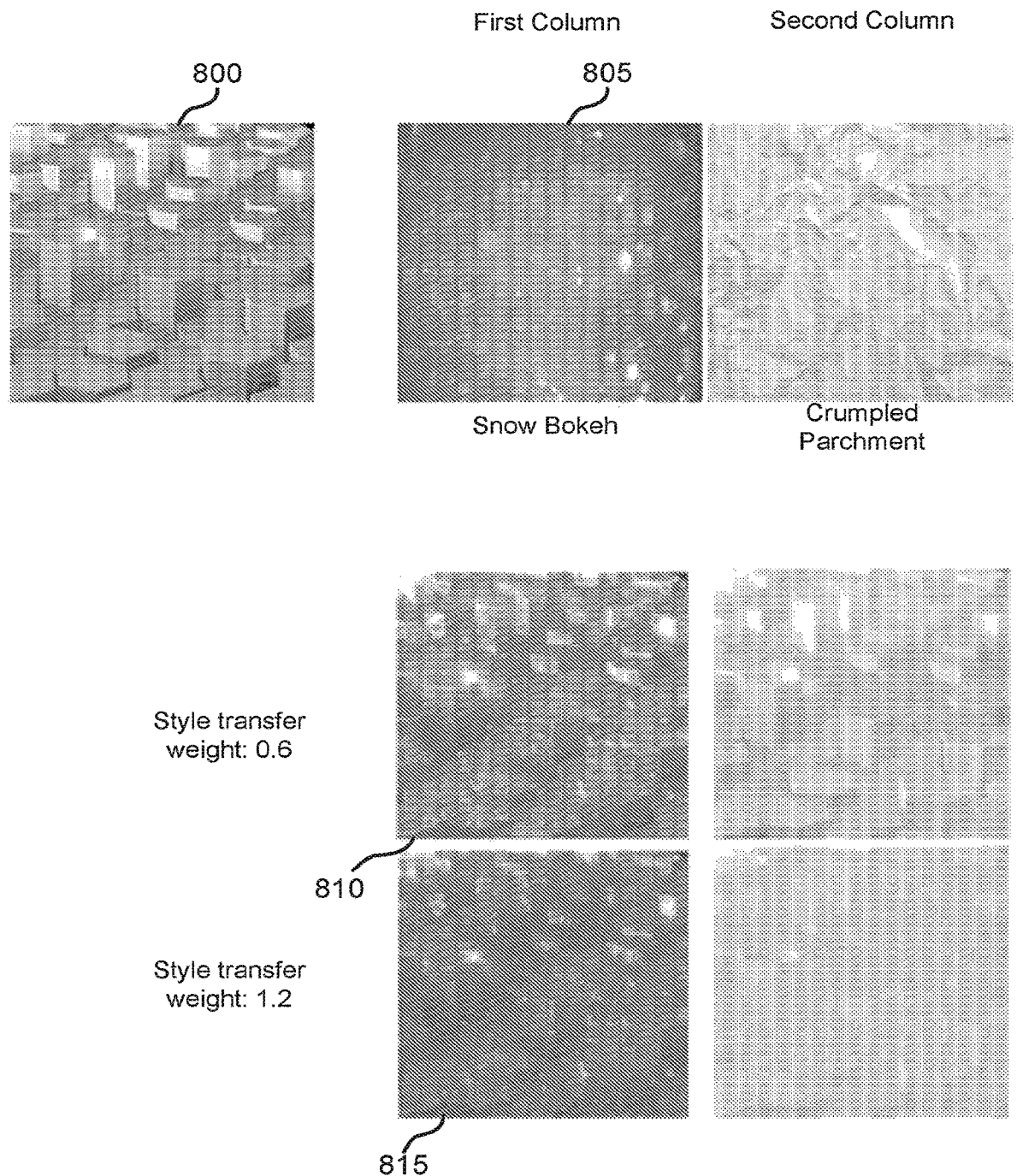
FIG. 8 shows an example of controllable style transfer based on a style weight according to aspects of the present disclosure.

FIG. 8 shows an example of controllable style transfer according to embodiments of the present disclosure. The example shown includes content image 800, abstract style transfer preset 805, first combined image 810, and second combined image 815.

According to an embodiment of the present disclosure, content image 800 and abstract style transfer preset 805 are used to generate first combined image 810 and second combined image 815 using controllable preset style transfer. In some cases, image processing apparatus 200 (as described with reference to FIG. 2) controls the intensity or weight of style to be transferred to content image 800. The swapping autoencoder model generates a continuous learned style space and supports interpolation and other vector arithmetic that perform controllable style transfer. Moreover, the multi-layered generator network based on StyleGAN supports layer-wise edits. Preset component 245 (described in FIG. 2) interpolates between the style code of content image 800 and the mean style code of the top k images from the cluster to perform preset style transfer. The interpolation weight controls the intensity of the style transfer.

In some cases, image processing apparatus 200 controls the factors of style that can be transferred to an image since the model enables layer-wise edits. Thus, the interpolated style code (for style transfer) is provided to selected layers of the generator network. The remaining layers receive the style code of content image 800. When the modified style code is input exclusively to the last several layers, the color of the style cluster is transferred to content image 800 (i.e., style is not transferred). Similarly, inputting the modified style code to a set of layers except the first several layers ensures that the original structure of content image 800 is undisturbed. In some examples, the style transfer weight value is adjusted based on the number and position of layers in the generator network modified by the interpolated style code. This way, image processing apparatus 200 preserves structural information of content image 800 in the combined images. Generator network is an example of, or includes aspects of, the corresponding element described with reference to FIGS. 3 and 4.

The style transfer weight value indicates the intensity of the transfer of style. The controllable style transfer is performed based on the modified style code provided to the generator network. In an example shown in FIG. 8, first combined image 810 is generated using a style transfer weight equal to 0.6. First combined image 810 combines a structure of content image 800 and style from abstract style transfer preset 805. Second combined image 815 is generated using a style transfer weight equal to 1.2. The intensity of style being transferred to second combined image 815 is relatively strong than that being transferred to first combined image 810.

In an embodiment, a combined image is generated by transferring exclusively or primarily color (i.e., without transferring other forms of style) from an abstract style transfer preset to the content image.

Figure 9:
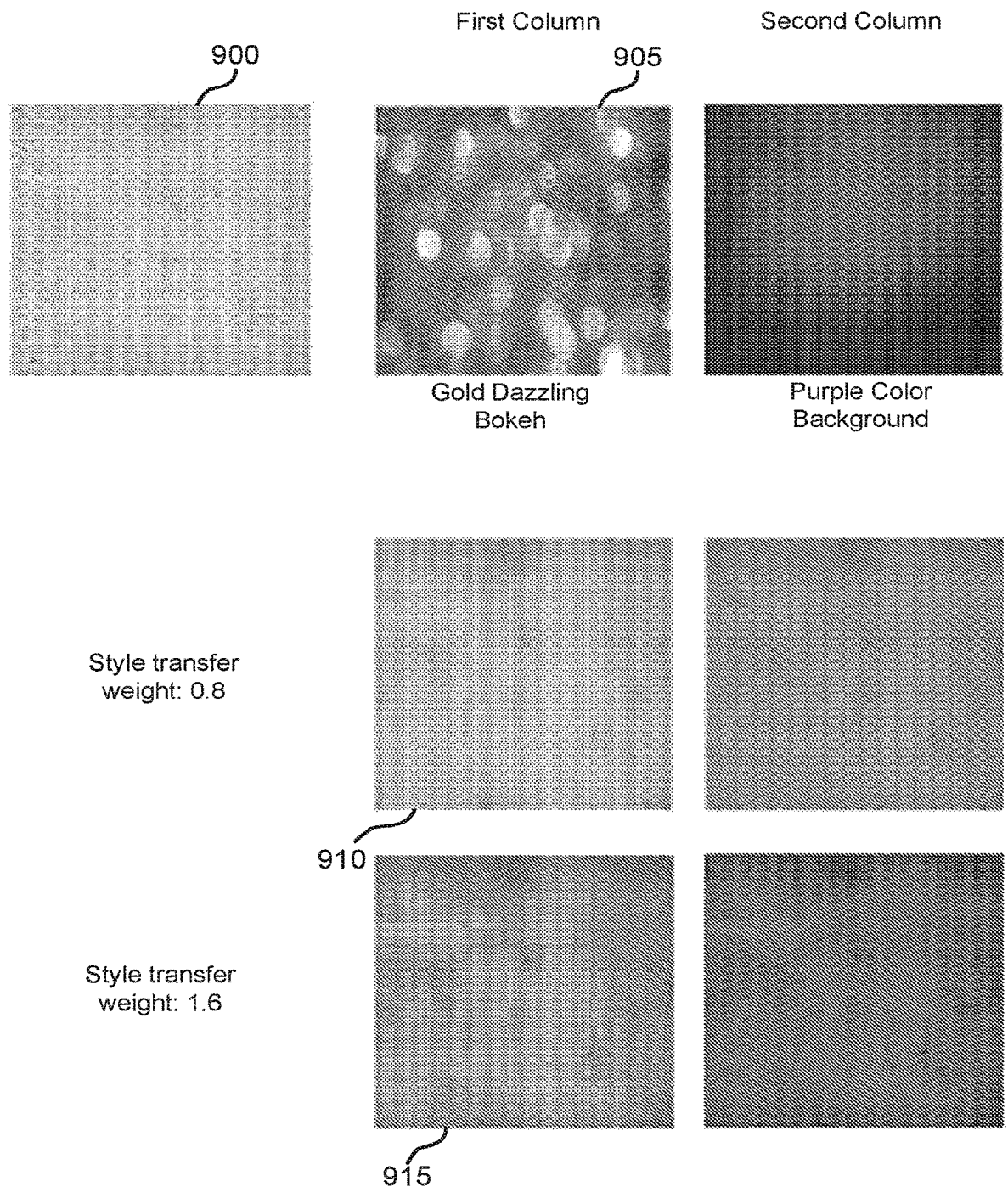
FIG. 9 shows an example of controllable style transfer based on a style weight according to aspects of the present disclosure.

FIG. 9 shows an example of controllable style transfer according to embodiments of the present disclosure. The example shown includes content image 900, abstract style transfer preset 905, first combined image 910, and second combined image 915. controllable style transfer using the proposed setup. Top row left shows content image 900 and the cluster names corresponding to abstract style transfer preset 905. Abstract style transfer preset 905 is a representative image from the cluster. The middle row and bottom row show the result of transferring exclusively color from a corresponding style cluster to content image 900. The style transfer weight value at the left (e.g., 0.8, 1.6) indicates the intensity of the style transfer.

According to an embodiment of the present disclosure, machine learning model 225 (as described in FIG. 2) enables layer-wise edits and can also control what "factors of style" are transferred to content image 900. The interpolated style code (for style transfer) is fed to one or more selected layers of the generator. The remaining layers receive the style code of the original input image.

In some examples, when the modified style code is provided primarily or exclusively to the last few layers, the color of the style cluster is transferred to an input image. Similarly, by feeding the modified style code to a set of layers except the first few layers, machine learning model 225 ensures that the original structure of the input image is undisturbed enabling structure preserving style transfer.

According to an embodiment, content image 900 and abstract style transfer preset 905 are used to generate first combined image 910 and second combined image 915 using controllable preset style transfer. In some cases, image processing apparatus 200 (as described with reference to FIG. 2) controls the intensity or weight of style to be transferred to a content image. A swapping autoencoder model generates a continuous learned style space and supports interpolation and other vector arithmetic that perform controllable style transfer. Moreover, the multi-layered generator network based on StyleGAN supports layer-wise edits. Preset component 245 (as described with reference to FIG. 2) interpolates between the style code of content image 900 and the mean style code of the top k images from the cluster to perform preset style transfer. The interpolation weight controls the intensity of the style transfer.

In some cases, image processing apparatus 200 controls the factors of style that can be transferred to an image since the model enables layer-wise edits. Thus, the interpolated style code (for style transfer) is provided to selected layers of the generator network. The remaining layers receive the style code of content image 900. When the modified style code is input exclusively to the last several layers, the color of the style cluster is transferred to content image 900 (i.e., style is not transferred). Similarly, inputting the modified style code to a set of layers except the first several layers ensures that the original structure of content image 900 is undisturbed. In some examples, the style transfer weight value is adjusted based on the number and position of layers in the generator network modified by the interpolated style code. This way, image processing apparatus 200 preserves structural information of content image 900 in the combined images. Generator network is an example of, or includes aspects of, the corresponding element described with reference to FIGS. 3 and 4.

The style transfer weight value indicates the intensity of the transfer of style. The controllable style transfer is performed based on the modified style code provided to the generator network. In an example shown in FIG. 9, first combined image 910 is generated using a style transfer weight equal to 0.8. First combined image 910 combines a structure of content image 900 and style from abstract style transfer preset 905 (in this case, exclusively color information). Second combined image 915 is generated using a style transfer weight equal to 1.6. The intensity of style being transferred to second combined image 915 is relatively strong than that being transferred to first combined image 910.

In an embodiment, a combined image (first combined image 910 or second combined image 915) is generated by transferring exclusively color (i.e., without other forms of style) from an abstract style transfer preset to a content image.

Figure 10:
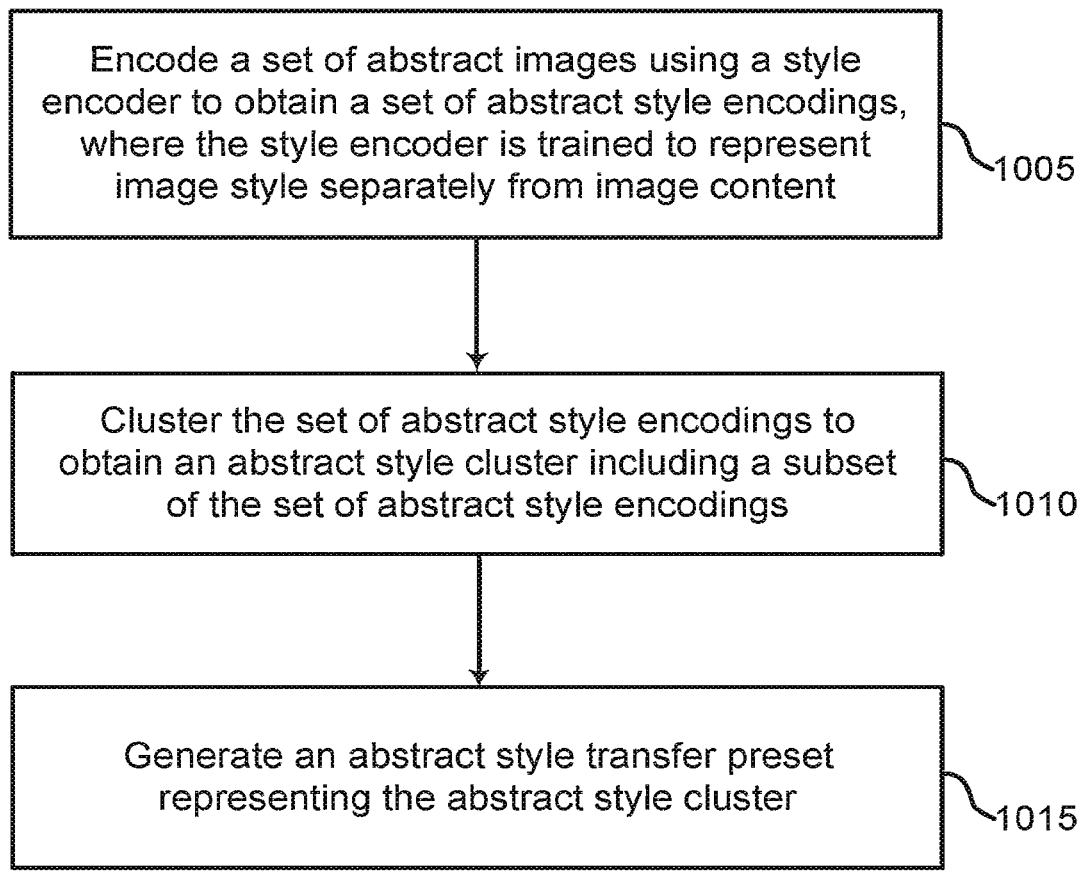
FIG. 10 shows an example of a method for image processing according to aspects of the present disclosure.

FIG. 10 shows an example of a method for image processing according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with embodiments of the present disclosure. In some cases, the operations described herein are composed of various substeps, or are performed in conjunction with other operations.

Embodiments of the present disclosure include methods to enable controllable preset style transfer by automatically learning, identifying, and naming styles in the abstract background domain. In some cases, a machine learning model learns a cluster of styles that are used to perform style transfer. In some examples, the machine learning model is used to generate style clusters for abstract images provided by the user and create a set of styles that the model learns and enables preset style transfer.

At operation 1005, the system encodes a set of abstract images using a style encoder to obtain a set of abstract style encodings, where the style encoder is trained to represent image style separately from image content. In some cases, the operations of this step refer to, or may be performed by, an image generation network as described with reference to FIGS. 2 and 5. According to an embodiment of the present disclosure, an image generation network includes a style encoder that is configured to encode an abstract style from abstract images. In some examples, a swapping autoencoder is trained in a self-supervised manner on a set of abstract background images to generate a style representation (e.g., an abstract style encoding) corresponding to each of the abstract background images.

At operation 1010, the system clusters the set of abstract style encodings to obtain an abstract style cluster including a subset of the set of abstract style encodings. In some cases, the operations of this step refer to, or may be performed by, a clustering component as described with reference to FIGS. 2 and 5.

According to some embodiments of the present disclosure, the clustering component performs k-means clustering using the style representation of the images in the training data to automatically identify the available styles in the dataset. In some examples, various values for k, i.e., {10, 50, 100, 500}, are used and k=100 and k=500 generate appropriate clusters based on qualitative and quantitative (e.g., silhouette score, energy score, and elbow curve) evaluation.

At operation 1015, the system generates an abstract style transfer preset representing the abstract style cluster. In some cases, the operations of this step refer to, or may be performed by, a preset component as described with reference to FIGS. 2 and 5.

According to some embodiments, a preset component automatically tags the clusters with appropriate names for the styles. The pre-trained CLIP model generates image embeddings of training images. The preset component performs zero-shot classification over a vocabulary of approximately 3000 style tags for the images. In some examples, the top 10 style tags associated with each image and the probabilities corresponding to the style tags are obtained. The preset component combines the tags of images within a cluster to name a style of that cluster using a style tag. In some cases, the preset component ranks a set of tags for an entire cluster based on the scores (e.g., a relevance score, a tag frequency score, an overall score). Further details regarding the scoring and ranking style tags for a cluster are provided with reference to FIGS. 12-15.

Figure 11:
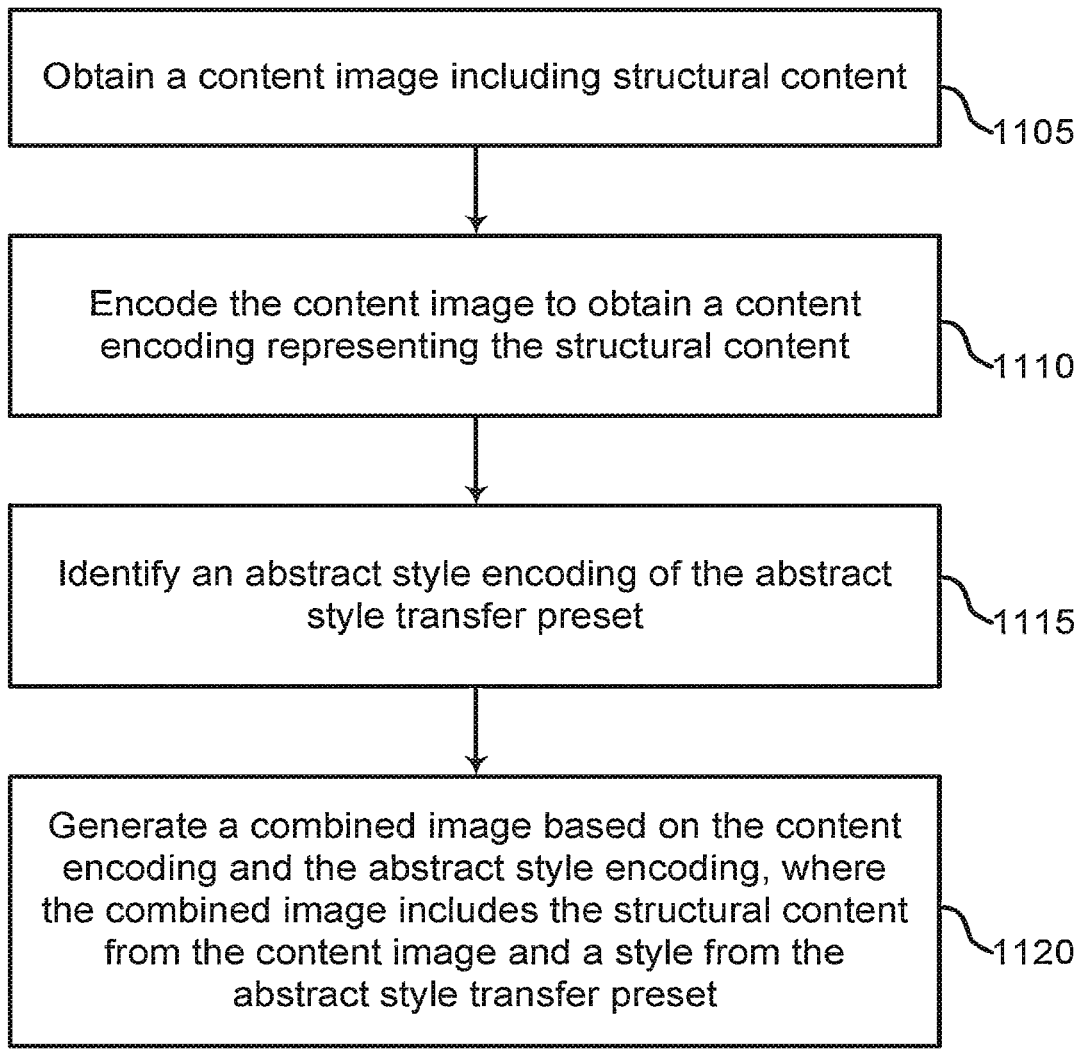
FIG. 11 shows an example of a method for generating a combined image according to aspects of the present disclosure.

FIG. 11 shows an example of a method for generating a combined image according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to some embodiments of the present disclosure, controllable preset style transfer is performed by automatically learning, identifying, and naming styles in the abstract background domain. In some cases, a content image and an abstract style transfer preset is provided by a user to the image processing apparatus. An image editing interface of the image processing apparatus generates a combined image that captures the structure information of the content image and style information from the abstract style transfer preset.

At operation 1105, the system obtains a content image including structural content. For example, the content image including structural content may be provided as input by the user. In some cases, the operations of this step refer to, or may be performed by, an image editing interface as described with reference to FIG. 2. According to an embodiment, the image editing interface is configured to receive a content image, wherein the combined image is generated based on the content image.

At operation 1110, the system encodes the content image to obtain a content encoding representing the structural content. In some cases, the operations of this step refer to, or may be performed by, an image generation network as described with reference to FIGS. 2 and 5. According to an embodiment of the present disclosure, an image generation network includes a content encoder that is configured to encode the structural content from user-provided content images.

At operation 1115, the system identifies an abstract style encoding of the abstract style transfer preset. In some cases, the operations of this step refer to, or may be performed by, an image generation network as described with reference to FIGS. 2 and 5. According to an embodiment of the present disclosure, the image generation network includes a style encoder that is configured to encode an abstract style from user-provided abstract images. In some cases, the style encoder encodes a set of abstract images to obtain a set of abstract style encodings, where the style encoder represents image style separately from image content. An abstract style transfer preset is generated for a corresponding abstract style cluster based on the abstract style encodings.

At operation 1120, the system generates a combined image based on the content encoding and the abstract style encoding, where the combined image includes the structural content from the content image and a style from the abstract style transfer preset. In some cases, the operations of this step refer to, or may be performed by, an image generation network as described with reference to FIGS. 2 and 5. The image generation network generates a combined image based on the content image and the abstract style transfer preset selected by the user.

Figure 12:
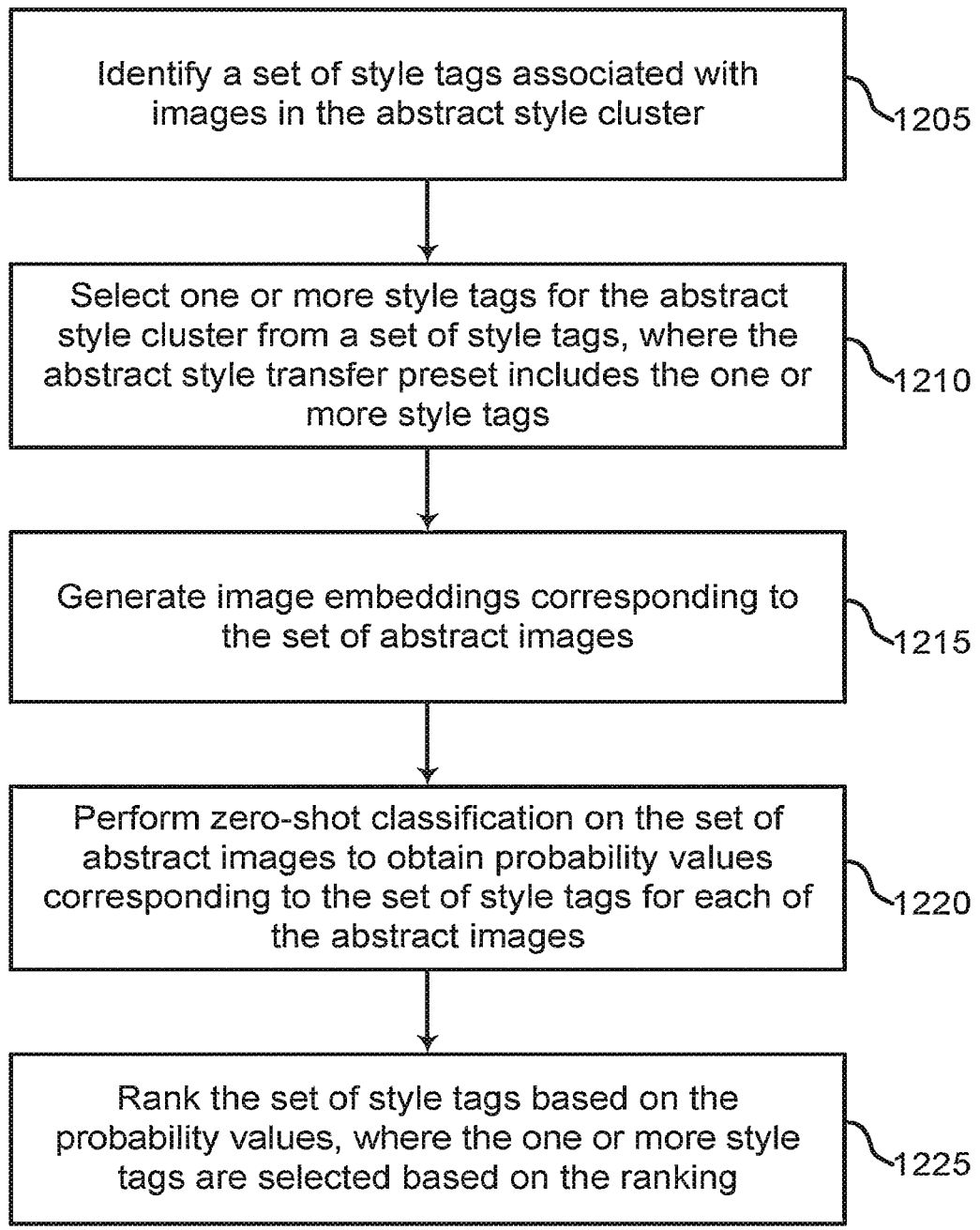
FIG. 12 shows an example of a method for image clustering according to aspects of the present disclosure.

FIG. 12 shows an example of a method for image clustering according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with embodiments of the present disclosure. In some cases, the operations described herein are composed of various substeps, or are performed in conjunction with other operations.

According to an embodiment of the present disclosure, a clustering component of the image processing apparatus is configured to cluster a set of abstract style encodings generated from the abstract images. Further, a preset component of the image processing apparatus generates an abstract style transfer preset that represents the abstract style cluster. In some cases, at inference, a user selects an abstract style transfer preset from a pool of pre-generated presets for style transfer.

At operation 1205, the system identifies a set of style tags associated with images in the abstract style cluster. In some cases, the operations of this step refer to, or may be performed by, a preset component as described with reference to FIGS. 2 and 5. According to some embodiments of the present disclosure, clustering is performed using the style representation of the images in the abstract images data to automatically identify the available styles in the dataset. Additionally, a preset component automatically identifies and tags the clusters with appropriate names for the styles.

At operation 1210, the system selects one or more style tags for the abstract style cluster from a set of style tags, where the abstract style transfer preset includes the one or more style tags. In some cases, the operations of this step refer to, or may be performed by, a preset component as described with reference to FIGS. 2 and 5. In some cases, appropriate clusters are identified based on qualitative and quantitative (e.g., silhouette score, energy score and elbow curve) evaluation of the abstract images data. Further detail regarding selecting style tags is provided with reference to FIGS. 12-14.

At operation 1215, the system generates image embeddings corresponding to the set of abstract images. In some cases, the operations of this step refer to, or may be performed by, a multi-modal encoder as described with reference to FIG. 2. In some cases, the multi-modal encoder (e.g., a pretrained CLIP model) generates image embeddings corresponding to the set of abstract background images.

At operation 1220, the system performs zero-shot classification on the set of abstract images to obtain probability values corresponding to the set of style tags for each of the abstract images. In some cases, the operations of this step refer to, or may be performed by, a preset component as described with reference to FIGS. 2 and 5. In some examples, the preset component performs zero-shot classification over a vocabulary of approximately 3000 style tags for the images.

At operation 1225, the system ranks the set of style tags based on the probability values, where the one or more style tags are selected based on the ranking. In some cases, the operations of this step refer to, or may be performed by, a scoring component as described with reference to FIGS. 2 and 5. According to an embodiment, the top 10 tags associated with each image along with the probabilities of the tags are obtained based on the zero-shot classification. The preset component combines the tags of images within a cluster to name the style of the cluster using a style tag.

In some cases, the predicted style tags are a noised result of zero-shot classification. Moreover, the tag vocabulary has an associated noise. Accordingly, the style clusters obtained from the previous step are used to combine the tags which removes the noise from the tags. A scoring component is configured to calculate scores (e.g., a relevance score, a tag frequency score, and an overall score) and tags for a style cluster are ranked and selected based on the scores.

Let c denote a particular cluster and let $\{I_1, I_2, \ldots, I_{m_c}\}$ denote the set of images present in the cluster and $m_c$ is the number of images in the cluster. Let $\{t_1, t_2, \ldots, t_n\}$ denote the style tag vocabulary. In some examples, the zero-shot CLIP model generates a probability value associated with each tag for an image. Let the tags and the associated probability for an image be $[(t_1, p(t_1)), (t_2, p(t_2)), \ldots, (t_n, p(t_n))]$. The scoring component calculates the three scores and the present component selects the most relevant tag for each cluster. Further details regarding computing scores to select style tags are provided with reference to FIGS. 13-15.

Figure 13:
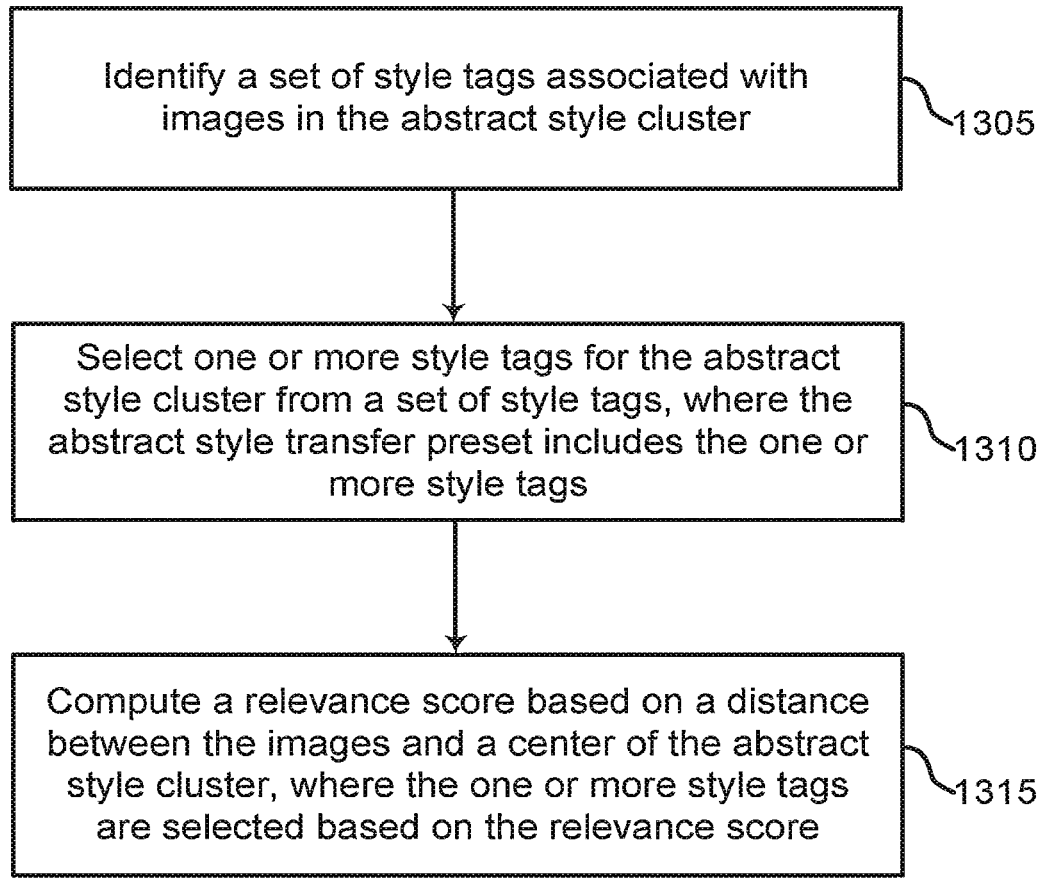
FIG. 13 shows an example of a method for computing a relevance score according to aspects of the present disclosure.

FIG. 13 shows an example of a method for computing a relevance score according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with embodiments of the present disclosure. In some cases, the operations described herein are composed of various substeps, or are performed in conjunction with other operations.

At operation 1305, the system identifies a set of style tags associated with images in the abstract style cluster. In some cases, the operations of this step refer to, or may be performed by, a preset component as described with reference to FIGS. 2 and 5. According to some embodiments of the present disclosure, clustering is performed using the style representation of the images in the abstract images data to automatically identify the available styles in the dataset. In some cases, a preset component automatically identifies and tags the clusters with appropriate names for the styles.

At operation 1310, the system selects one or more style tags for the abstract style cluster from a set of style tags, where the abstract style transfer preset includes the one or more style tags. In some cases, the operations of this step refer to, or may be performed by, a preset component as described with reference to FIGS. 2 and 5. In some cases, the preset component identifies style clusters based on qualitative and quantitative (e.g., silhouette score, energy score and elbow curve) evaluation of the abstract images data. As described with reference to FIG. 12, the scoring component computes a probability value for each style tag with regards to an image. The style tags are ranked and selected based on the probability value.

At operation 1315, the system computes a relevance score based on a distance between the images and a center of the abstract style cluster, where the one or more style tags are selected based on the relevance score. In some cases, the operations of this step refer to, or may be performed by, a scoring component as described with reference to FIGS. 2 and 5.

According to an embodiment, a relevance score measures the relevance of the tag to each image weighted by the image's similarity to the center of a style cluster. The scoring component assigns relatively high weight to tags of images that are not outliers by multiplying with the similarity of an image to the center. In some cases, the scoring component considers the tags that are classified with high confidence by multiplying with the tag probability. In some cases, if sim (Ii, c) represents the cosine similarity between an image and the cluster center, the relevance score is calculated as follows:

$$\text{Relevance}(t_i \to c) = \frac{1}{m_c} \sum_{j=1}^{m_c} (p(t_i) \cdot sim(I_j, c)) \quad (1)$$

Figure 14:
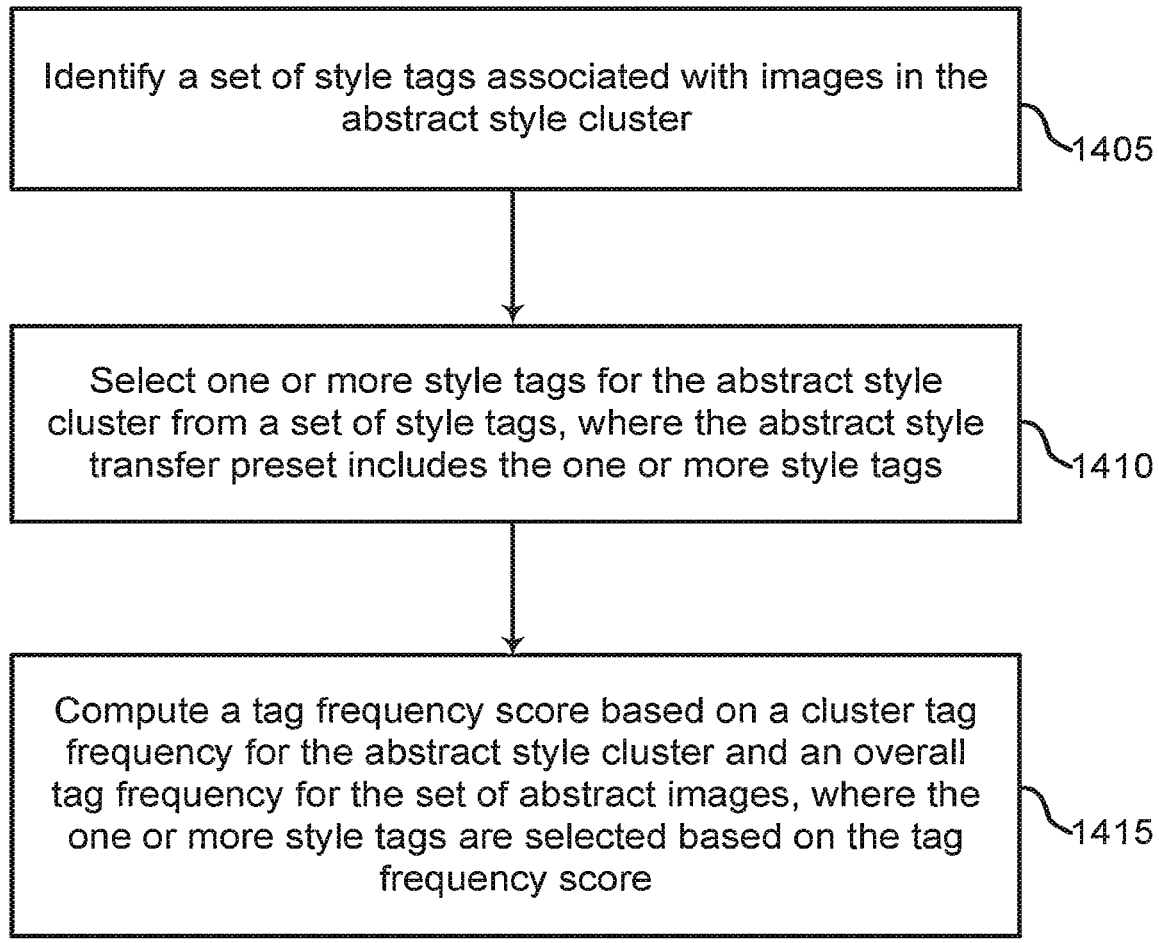
FIG. 14 shows an example of a method for computing a tag frequency score according to aspects of the present disclosure.

FIG. 14 shows an example of a method for computing a tag frequency score according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with embodiments of the present disclosure. In some cases, the operations described herein are composed of various substeps, or are performed in conjunction with other operations.

At operation 1405, the system identifies a set of style tags associated with images in the abstract style cluster. In some cases, the operations of this step refer to, or may be performed by, a preset component as described with reference to FIGS. 2 and 5. According to some embodiments of the present disclosure, a swapping autoencoder model learns the style space of an abstract image dataset that includes abstract images. Further, the learned style space of the abstract images is used to cluster the images based on the style representation. In some examples, the preset component identifies and tags the clusters with appropriate names for the styles using a pre-trained CLIP model.

At operation 1410, the system selects one or more style tags for the abstract style cluster from a set of style tags, where the abstract style transfer preset includes the one or more style tags. In some cases, the operations of this step refer to, or may be performed by, a preset component as described with reference to FIGS. 2 and 5. In some cases, appropriate clusters are identified based on qualitative and quantitative evaluation of the abstract images dataset. As described with reference to FIGS. 12-13, a probability value associated with each tag for an image is computed, based on which the style tags are ranked and selected. In some cases, the preset component selects the most appropriate tag for the abstract style cluster when the images and the tags associated with each image are provided.

At operation 1415, the system computes a tag frequency score based on a cluster tag frequency for the abstract style cluster and an overall tag frequency for the set of abstract images, where the one or more style tags are selected based on the tag frequency score. In some cases, the operations of this step refer to, or may be performed by, a scoring component as described with reference to FIGS. 2 and 5.

In some cases, the tag frequency score is referred to as a term frequency and inverse document frequency (TF-IDF) score. TF-IDF score ensures that common tags (i.e., tags that appear in all the clusters) are not to be given much weight or to be included. For example, "abstract" or "background" are tags that are associated with all images in the dataset. These tags are not informative in identifying a specific style since they are present ubiquitously. Such ubiquitous tags are examples of noisy tags that are filtered. Accordingly, the TF-IDF score is calculated as follows:

$$TFIDF(t_i, c, C) = TF(t, c) \cdot IDF(t, C) \quad (2)$$

$$TF(t, c) = \log(1 + freq(t, c))$$

$$IDF(t, C) = \log\left(\frac{N}{\text{count}(t_i \in c \text{ AND } c \in C)}\right)$$

where count ($t_i \in c$ AND $c \in C$) calculates the number of clusters with at least one image that has the tag $t_i$ in the top 10. Similarly, freq(t, c) is the number of images with tag $t_i$ predicted in the top 10 within cluster c.

Additionally, the scoring component computes an overall score as the product of the relevance score and the TF-IDF score. In some cases, the overall score is referred to as a combined score or a total score. The overall score is formulated as follows:

$$\text{overall} = \text{Relevance} \cdot TFIDF \quad (3)$$

Figure 15:
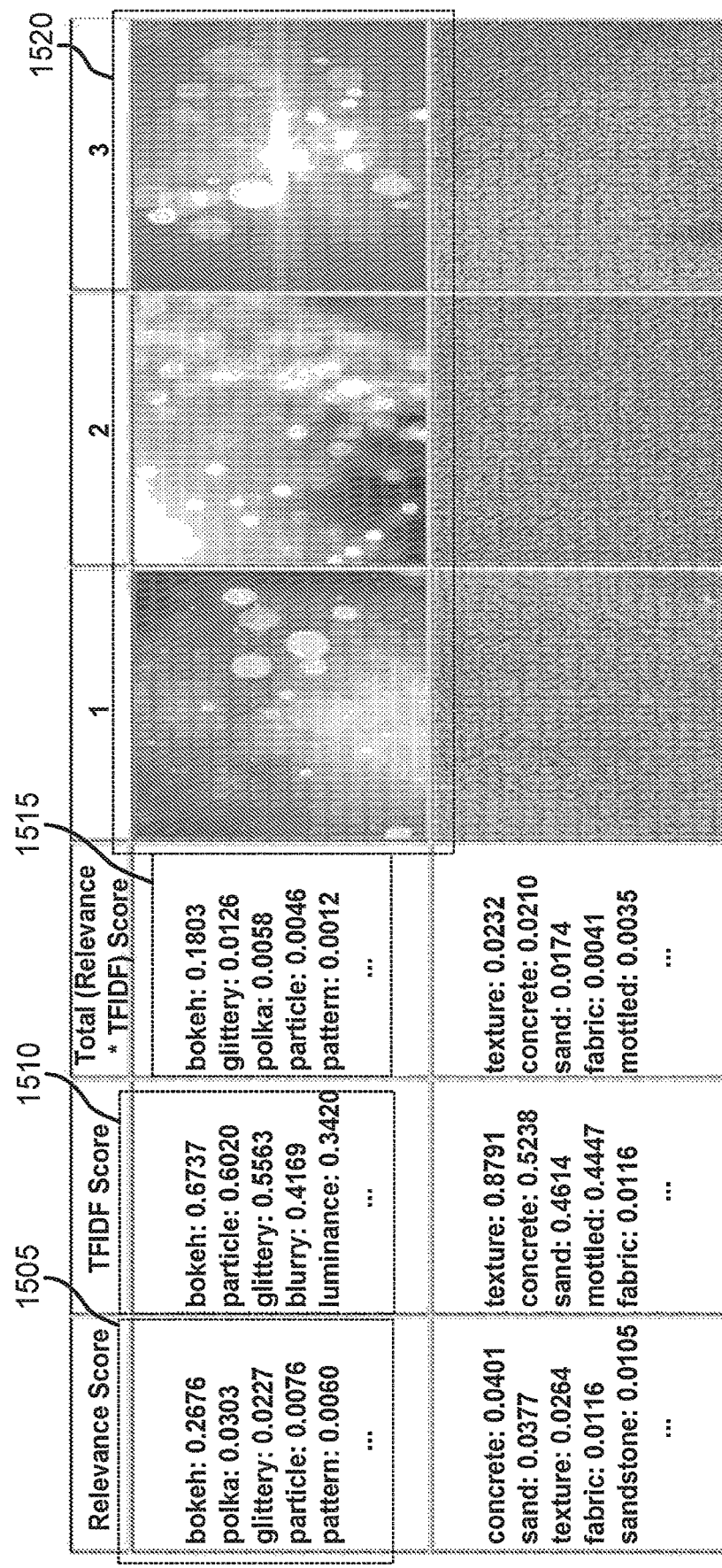
FIG. 15 shows an example of image clustering according to aspects of the present disclosure.

FIG. 15 shows an example of image clustering according to embodiments of the present disclosure. FIG. 15 shows an example of clusters and top n style tags that are annotated according to metrics (the relevance score, the tag frequency score, and the overall score). The example shown includes relevance score 1505, tag frequency score 1510, combined score 1515, and cluster 1520. Further detail regarding the relevance score 1505, tag frequency score 1510, and combined score 1515 is provided with reference to FIGS. 13-14.

In some cases, relevance score 1505 calculates the relevance of each tag to a specific cluster. The tag frequency score 1510 (or TF-IDF score as described in FIG. 14) calculates the specificity of each tag to a specific cluster relative to other clusters. Combined score 1515 is the product of relevance score 1505 and tag frequency score 1510. FIG. 15 shows an example of image clusters and the style tags that are automatically annotated based on relevance score 1505, tag frequency score 1510, and combined score 1515. This example shows the relevance and specificity of the style tags to each cluster.

The first row shows cluster 1520 that is a style cluster including three images. The three images are representative images from the style cluster and the style cluster may include more than three images. The image processing apparatus generates most relevant style tags based on the relevance score 1505, tag frequency score 1510, and combined score 1515. As an example, based on relevance score 1505, the image processing apparatus identifies "bokeh", "polka", "glittery", "particle", "pattern" as the top 5 style tags for cluster 1520. Based on tag frequency score 1510, the image processing apparatus identifies "bokeh", "particle", "glittery", "blurry", "luminance" as the top 5 style tags for cluster 1520. Based on combined score 1515, the image processing apparatus identifies "bokeh", "glittery", "polka", "particle", "pattern" as the top 5 style tags for cluster 1520. Accordingly, if combined score 1515 is selected as the metric, style tags such as "bokeh", "glittery", "polka", "particle", and "pattern" are assigned to images of cluster 1520. Similarly, based on combined score 1515, style tags such as "texture", "concrete", "sand", "fabric", and "mottled" are considered relevant and top tags for the cluster on the second row.

Training and Evaluation

Figure 16:
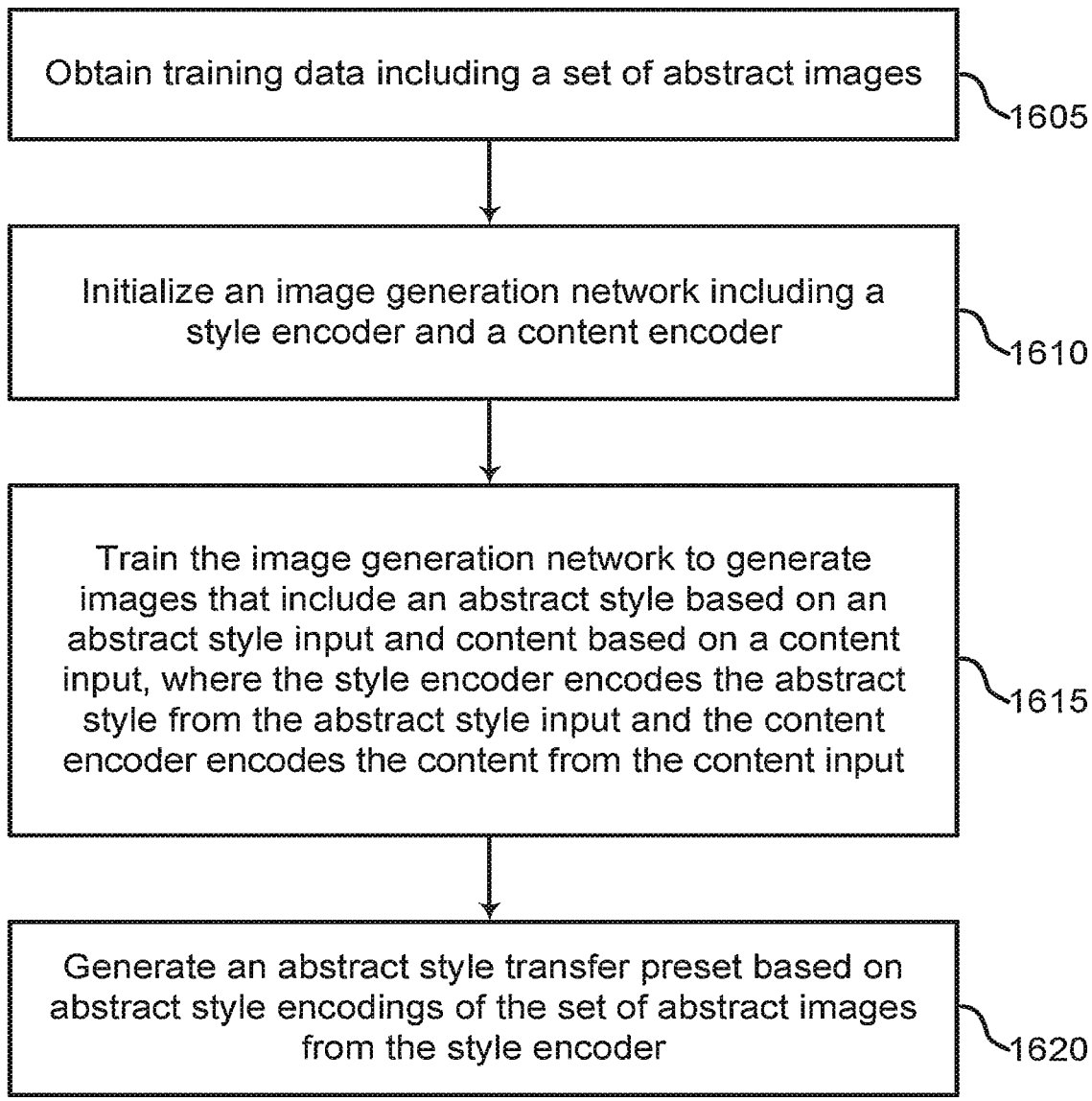
FIG. 16 shows an example of a method for training an image generation network according to aspects of the present disclosure.
Figure 17:
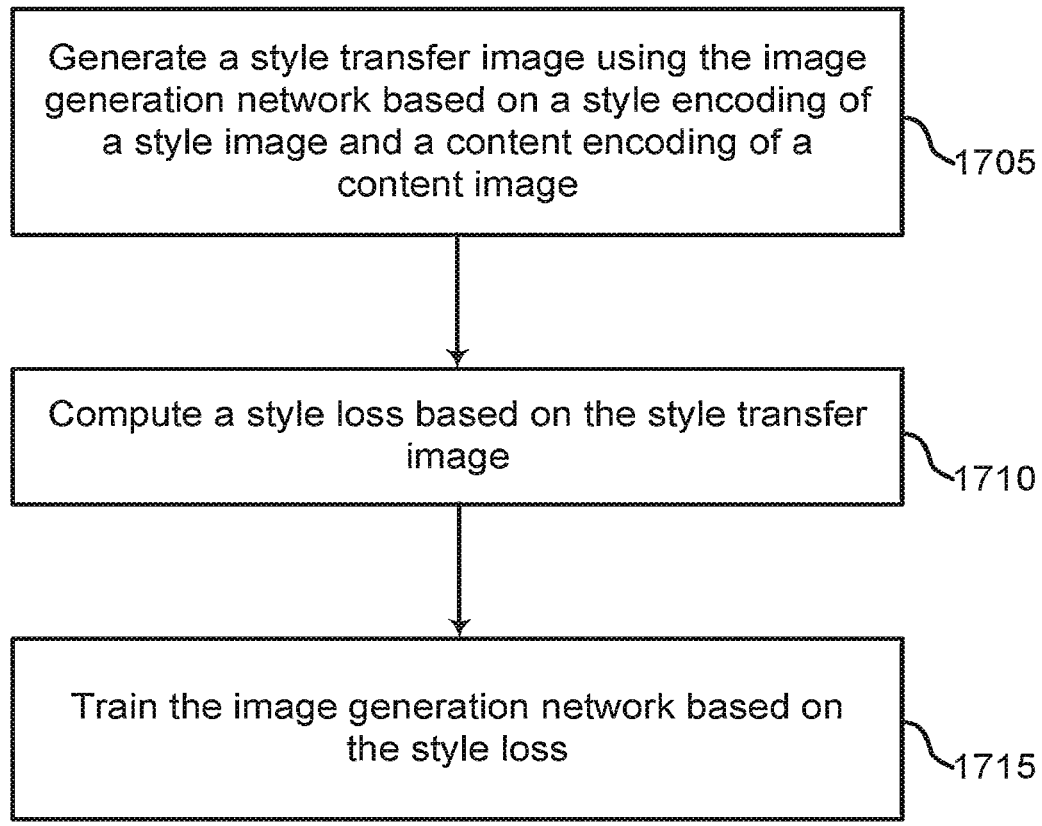
FIG. 17 shows an example of a method for training an image generation network according to aspects of the present disclosure.

In FIGS. 16-17, a method, apparatus, and non-transitory computer readable medium for image processing is described. One or more embodiments of the method, apparatus, and non-transitory computer readable medium include obtaining training data including a plurality of abstract images; initializing an image generation network including a style encoder and a content encoder; training the image generation network to generate images that include an abstract style based on an abstract style input and content based on a content input, wherein the style encoder encodes the abstract style from the abstract style input and the content encoder encodes the content from the content input; and generating an abstract style transfer preset based on abstract style encodings of the plurality of abstract images from the style encoder.

Some examples of the method, apparatus, and non-transitory computer readable medium further include generating a reconstructed image using the image generation network based on a style encoding and a content encoding of an input image. Some examples further include computing a reconstruction loss based on the reconstructed image, wherein the image generation network is trained based on the reconstruction loss.

Some examples of the method, apparatus, and non-transitory computer readable medium further include generating a style transfer image using the image generation network based on a style encoding of a style image and a content encoding of a content image. Some examples further include computing a style loss based on the style transfer image, wherein the image generation network is trained based on the style loss.

Some examples of the method, apparatus, and non-transitory computer readable medium further include clustering the abstract style encodings to obtain an abstract style cluster comprising a subset of the abstract style encodings. Some examples further include generating the abstract style transfer preset representing the abstract style cluster.

Some examples of the method, apparatus, and non-transitory computer readable medium further include identifying a plurality of style tags associated with images in the abstract style cluster. Some examples further include selecting one or more style tags for the abstract style cluster from the plurality of style tags, wherein the abstract style transfer preset includes the one or more style tags.

FIG. 16 shows an example of a method for training an image generation network according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with embodiments of the present disclosure. In some cases, the operations described herein are composed of various substeps, or are performed in conjunction with other operations.

At operation 1605, the system obtains training data including a set of abstract images. In some cases, the operations of this step refer to, or may be performed by, a training component as described with reference to FIG. 2. According to an embodiment of the present disclosure, a training component trains a swapping autoencoder model to learn style representation in a self-supervised manner.

According to an embodiment of the present disclosure, abstract background images are input to the machine learning model for training. In some examples, the training component trains the swapping autoencoder model on a custom abstract background dataset (e.g., 1 million training images) to learn a style space, which is also referred to as a learned style space. The trained model performs learned unsupervised style transfer for images.

At operation 1610, the system initializes an image generation network including a style encoder and a content encoder. In some cases, the operations of this step refer to, or may be performed by, a training component as described with reference to FIG. 2. According to an embodiment of the disclosure, the image generation network includes a style encoder and a content encoder. The image generation network is configured to generate images that include an abstract style from a style source and content information from a content source.

At operation 1615, the system trains the image generation network to generate images that include an abstract style based on an abstract style input and content based on a content input, where the style encoder encodes the abstract style from the abstract style input and the content encoder encodes the content from the content input. In some cases, the operations of this step refer to, or may be performed by, a training component as described with reference to FIG. 2.

According to an embodiment, image generation network includes style encoder. A style encoder encodes the abstract images to generate a set of abstract style encodings. In some cases, the style encoder is trained to represent image style and image content separately. In some cases, the abstract style encodings are clustered to generate an abstract style cluster that includes the abstract style encodings. According to an embodiment, image generation network includes content encoder. Content encoder encodes the content images to generate a set of content encodings.

At operation 1620, the system generates an abstract style transfer preset based on abstract style encodings of the set of abstract images from the style encoder. In some cases, the operations of this step refer to, or may be performed by, a preset component as described with reference to FIGS. 2 and 5.

According to an embodiment, the preset component is configured to automatically tag the abstract style cluster with a style name for the style of the abstract style cluster based on a pre-trained CLIP model evaluated on a vocabulary of style tags. In some cases, the preset component includes a scoring component that identifies and selects the most appropriate tags for a cluster based on three scores (i.e., relevance score, tag frequency score, and overall score). The style tags of images within a cluster are combined to obtain a name for a style cluster of style clusters. Thus, the preset component generates the abstract style transfer preset that represents the abstract style cluster. The preset component generates one or more abstract style transfer presets that the machine learning model has learned and enables preset style transfer for users.

FIG. 17 shows an example of a method for training an image generation network according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with embodiments of the present disclosure. In some cases, the operations described herein are composed of various substeps, or are performed in conjunction with other operations.

At operation 1705, the system generates a style transfer image using the image generation network based on a style encoding of a style image and a content encoding of a content image. In some cases, the operations of this step refer to, or may be performed by, an image generation network as described with reference to FIGS. 2 and 5.

At operation 1710, the system computes a style loss based on the style transfer image. In some cases, the operations of this step refer to, or may be performed by, a training component as described with reference to FIG. 2.

At operation 1715, the system trains the image generation network based on the style loss. In some cases, the operations of this step refer to, or may be performed by, a training component as described with reference to FIG. 2.

Figure 18:
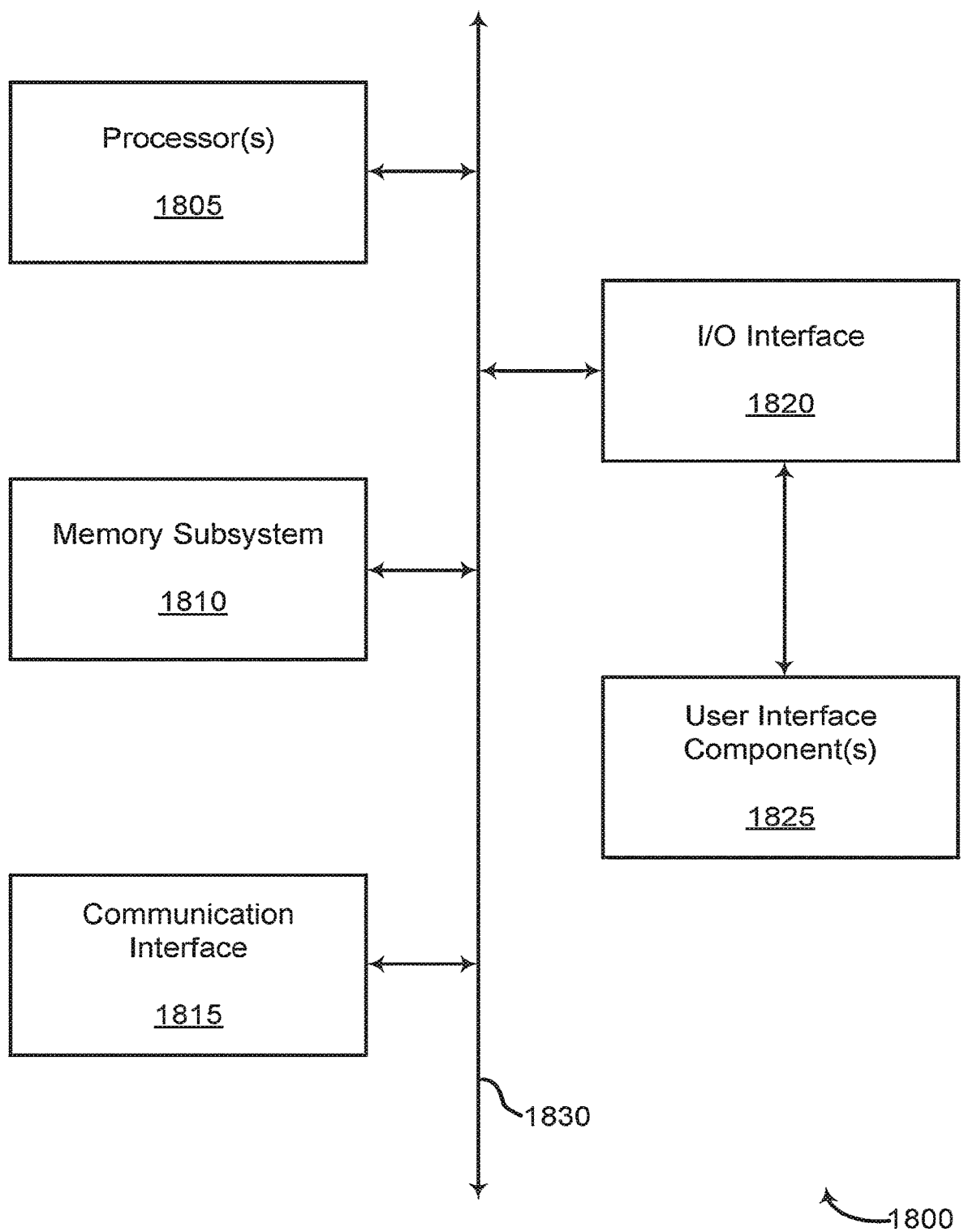
FIG. 18 shows an example of a computing device according to aspects of the present disclosure.

FIG. 18 shows an example of a computing device 1800 for image processing according to embodiments of the present disclosure. The example shown includes computing device 1800, processor(s) 1805, memory subsystem 1810, communication interface 1815, I/O interface 1820, user interface component(s) 1825, and channel 1830.

In some embodiments, computing device 1800 is an example of, or includes aspects of, image processing apparatus 200 of FIG. 2. In some embodiments, computing device 1800 includes one or more processors 1805 that can execute instructions stored in memory subsystem 1810 for encoding a set of abstract images using a style encoder to obtain a set of abstract style encodings, where the style encoder is trained to represent image style separately from image content; clustering the set of abstract style encodings to obtain an abstract style cluster including a subset of the set of abstract style encodings; and generating an abstract style transfer preset representing the abstract style cluster.

According to some embodiments, computing device 1800 includes one or more processors 1805. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1810 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1815 operates at a boundary between communicating entities (such as computing device 1800, one or more user devices, a cloud, and one or more databases) and channel 1830 and can record and process communications. In some cases, communication interface 1815 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1820 is controlled by an I/O controller to manage input and output signals for computing device 1800. In some cases, I/O interface 1820 manages peripherals not integrated into computing device 1800. In some cases, I/O interface 1820 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1820 or via hardware components controlled by the I/O controller.

According to some embodiments, user interface component(s) 1825 enable a user to interact with computing device 1800. In some cases, user interface component(s) 1825 include an audio device, such as an external speaker system, an external display device such as a display screen, an input device (e.g., a remote-control device interfaced with a user interface directly or through the I/O controller), or a combination thereof. In some cases, user interface component(s) 1825 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
encoding a plurality of abstract images using a style encoder to obtain a plurality of abstract style encodings, wherein the style encoder is trained to represent image style separately from image content;
clustering the plurality of abstract style encodings to obtain an abstract style cluster comprising a subset of the plurality of abstract style encodings; and
generating an abstract style transfer preset representing the abstract style cluster by identifying a plurality of style tags associated with images in the abstract style cluster and selecting one or more style tags for the abstract style cluster from the plurality of style tags, wherein the abstract style transfer preset includes the one or more style tags.

2. The method of claim 1, further comprising:
obtaining a content image including structural content; and
generating a combined image based on the content image and the abstract style transfer preset, wherein the combined image includes the structural content from the content image and a style from the abstract style transfer preset.

3. The method of claim 2, further comprising:
encoding the content image to obtain a content encoding representing the structural content; and
identifying an abstract style encoding of the abstract style transfer preset, wherein the combined image is generated based on the content encoding and the abstract style encoding.

4. The method of claim 2, further comprising:
receiving a user input identifying the abstract style transfer preset from a plurality of abstract style transfer presets, wherein the combined image is generated based on the user input.

5. The method of claim 2, further comprising:
receiving a user input indicating a style transfer weight corresponding to the abstract style transfer preset, wherein the combined image is generated based on the style transfer weight.

6. The method of claim 1, wherein:
the style encoder is trained using unsupervised learning based on the plurality of abstract images.

7. The method of claim 1, further comprising:
generating image embeddings corresponding to the plurality of abstract images;
performing zero-shot classification on the plurality of abstract images to obtain probability values corresponding to the plurality of style tags for each of the abstract images; and
ranking the plurality of style tags based on the probability values, wherein the one or more style tags are selected based on the ranking.

8. The method of claim 1, further comprising:
computing a relevance score based on a distance between the images and a center of the abstract style cluster, wherein the one or more style tags are selected based on the relevance score.

9. The method of claim 1, further comprising:
computing a tag frequency score based on a cluster tag frequency for the abstract style cluster and an overall tag frequency for the plurality of abstract images, wherein the one or more style tags are selected based on the tag frequency score.

10. A method comprising:
obtaining training data including a plurality of abstract images;
initializing an image generation network including a style encoder and a content encoder;
training the image generation network to generate images that include an abstract style based on an abstract style input and content based on a content input, wherein the style encoder encodes the abstract style from the abstract style input and the content encoder encodes the content from the content input;
generating an abstract style transfer preset based on abstract style encodings of the plurality of abstract images from the style encoder by clustering the abstract style encodings to obtain an abstract style cluster comprising a subset of the abstract style encodings and generating the abstract style transfer preset representing the abstract style cluster by identifying a plurality of style tags associated with images in the abstract style cluster; and
selecting one or more style tags for the abstract style cluster from the plurality of style tags, wherein the abstract style transfer preset includes the one or more style tags.

11. The method of claim 10, further comprising:
generating a reconstructed image using the image generation network based on a style encoding and a content encoding of an input image; and
computing a reconstruction loss based on the reconstructed image, wherein the image generation network is trained based on the reconstruction loss.

12. The method of claim 10, further comprising:
generating a style transfer image using the image generation network based on a style encoding of a style image and a content encoding of a content image; and
computing a style loss based on the style transfer image, wherein the image generation network is trained based on the style loss.

13. An apparatus comprising:
a processor;
a memory comprising instructions executable by the processor;
an image generation network including a style encoder and a content encoder configured to generate images that include an abstract style based on an abstract style input and content based on a content input, wherein the style encoder encodes the abstract style from the abstract style input and the content encoder encodes the content from the content input;
a clustering component configured to cluster a plurality of abstract style encodings from the style encoder to obtain an abstract style cluster comprising a subset of the plurality of abstract style encodings; and
a preset component configured to generate an abstract style transfer preset representing the abstract style cluster by identifying a plurality of style tags associated with images in the abstract style cluster and selecting one or more style tags for the abstract style cluster from the plurality of style tags, wherein the abstract style transfer preset includes the one or more style tags.

14. The apparatus of claim 13, further comprising:
a multi-modal encoder configured to generate image embeddings for a plurality of abstract images and to generate text embeddings for the plurality of style tags.

15. The apparatus of claim 13, further comprising:
a training component configured to train the image generation network using unsupervised learning based on a plurality of abstract images.

16. The apparatus of claim 13, further comprising:
an image editing interface configured to receive a user input identifying the abstract style transfer preset from a plurality of abstract style transfer presets, wherein a combined image is generated based on the user input.

* * * * *